United States Patent
Im et al.

(10) Patent No.: US 12,360,389 B2
(45) Date of Patent: *Jul. 15, 2025

(54) REFLECTING MODULE FOR OPTICAL IMAGE STABILIZATION (OIS) AND CAMERA MODULE INCLUDING THE SAME

(71) Applicant: Samsung Electro-Mechanics Co., Ltd., Suwon-si (KR)

(72) Inventors: Ah Hyeon Im, Suwon-si (KR); Bong Won Jeong, Suwon-si (KR); Nam Ki Park, Suwon-si (KR); Ta Kyoung Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/661,002

(22) Filed: May 10, 2024

(65) Prior Publication Data
US 2024/0295746 A1  Sep. 5, 2024

Related U.S. Application Data

(63) Continuation of application No. 17/536,449, filed on Nov. 29, 2021, which is a continuation of application
(Continued)

(30) Foreign Application Priority Data

Feb. 8, 2017 (KR) .................. 10-2017-0017527
Apr. 17, 2017 (KR) .................. 10-2017-0049048

(51) Int. Cl.
*G02B 27/64* (2006.01)
*G02B 7/02* (2021.01)
(Continued)

(52) U.S. Cl.
CPC .......... *G02B 27/646* (2013.01); *G02B 7/021* (2013.01); *G02B 7/08* (2013.01); *G02B 7/09* (2013.01);
(Continued)

(58) Field of Classification Search
None
See application file for complete search history.

(56) References Cited

U.S. PATENT DOCUMENTS 5,041,852 A  8/1991  Misawa et al.
8,752,969 B1  6/2014  Kane et al.
(Continued)

FOREIGN PATENT DOCUMENTS

CN  101292194 A  10/2008
CN  104136986 A  11/2014
(Continued)

OTHER PUBLICATIONS

Chinese Office Action Issued on Apr. 1, 2024, in Counterpart Chinese Patent Application No. 202111481493.1 (5 Pages in English, 9 Pages in Chinese).
(Continued)

*Primary Examiner* — Derek S. Chapel
(74) *Attorney, Agent, or Firm* — NSIP Law

(57) ABSTRACT

A reflecting module for optical image stabilization (OIS) includes a housing; a rotation holder provided in the housing and comprising a reflecting member; a rotation plate provided in the housing between an inner wall of the housing and the rotation holder so that the rotation holder is supported by the inner wall of the housing via the rotation plate; and a driving part configured to apply a driving force to the rotation holder to move the rotation holder.

27 Claims, 28 Drawing Sheets

Related U.S. Application Data

No. 16/861,358, filed on Apr. 29, 2020, now Pat. No. 11,262,593, which is a continuation of application No. 15/854,578, filed on Dec. 26, 2017, now Pat. No. 10,678,062.

(51) Int. Cl.

| | | |
|---|---|---|
| *G02B 7/08* | (2021.01) | |
| *G02B 7/09* | (2021.01) | |
| *G02B 13/00* | (2006.01) | |
| *G02B 26/08* | (2006.01) | |
| *G03B 5/00* | (2021.01) | |
| *G03B 17/17* | (2021.01) | |
| *H04N 23/68* | (2023.01) | |
| *G03B 13/36* | (2021.01) | |

(52) U.S. Cl.
CPC ..... *G02B 13/0065* (2013.01); *G02B 26/0816* (2013.01); *G02B 27/642* (2013.01); *G03B 5/00* (2013.01); *H04N 23/68* (2023.01); *G03B 13/36* (2013.01); *G03B 17/17* (2013.01); *G03B 2205/0023* (2013.01); *G03B 2205/003* (2013.01); *G03B 2205/0069* (2013.01)

(56) References Cited

U.S. PATENT DOCUMENTS

| | | | |
|---|---|---|---|
| 9,258,486 B2 | 2/2016 | Hu et al. | |
| 10,334,146 B2 * | 6/2019 | Im | G02B 13/009 |
| 10,394,046 B2 * | 8/2019 | Jeong | G02B 27/646 |
| 10,516,773 B2 | 12/2019 | Yoon et al. | |
| 10,534,194 B2 | 1/2020 | Lee et al. | |
| 10,594,911 B2 * | 3/2020 | Im | H04N 23/687 |
| 10,678,062 B2 | 6/2020 | Im et al. | |
| 10,816,756 B2 * | 10/2020 | Lee | H04N 23/55 |
| 10,866,430 B2 | 12/2020 | Kim et al. | |
| 11,036,061 B2 * | 6/2021 | Jeong | H04N 23/57 |
| 11,262,593 B2 | 3/2022 | Im et al. | |
| 11,277,550 B2 * | 3/2022 | Im | G02B 7/102 |
| 11,409,073 B2 * | 8/2022 | Lee | G02B 7/1805 |
| 2006/0268431 A1 | 11/2006 | Jin | |
| 2008/0211922 A1 | 9/2008 | Murashima et al. | |
| 2009/0122406 A1 | 5/2009 | Rouvinen et al. | |
| 2009/0122421 A1 | 5/2009 | Sakamoto et al. | |
| 2010/0053784 A1 | 3/2010 | Kang et al. | |
| 2012/0182472 A1 | 7/2012 | Inata et al. | |
| 2014/0009631 A1 | 1/2014 | Topliss | |
| 2014/0354833 A1 | 12/2014 | Takizawa | |
| 2015/0002683 A1 | 1/2015 | Hu et al. | |
| 2015/0215541 A1 | 7/2015 | Nomura et al. | |
| 2016/0233793 A1 | 8/2016 | Henderson et al. | |
| 2018/0017844 A1 * | 1/2018 | Yu | G02B 7/08 |
| 2018/0095293 A1 | 4/2018 | Yeon et al. | |
| 2018/0109660 A1 * | 4/2018 | Yoon | H04N 23/687 |
| 2018/0120674 A1 * | 5/2018 | Avivi | G03B 3/10 |
| 2018/0231793 A1 | 8/2018 | Jeong et al. | |
| 2018/0239162 A1 | 8/2018 | Lee et al. | |
| 2018/0259787 A1 | 9/2018 | Kim et al. | |
| 2018/0356645 A1 | 12/2018 | Jeong et al. | |
| 2018/0364450 A1 | 12/2018 | Lee et al. | |
| 2018/0367714 A1 | 12/2018 | Im et al. | |
| 2019/0004328 A1 | 1/2019 | Lee et al. | |
| 2019/0377155 A1 * | 12/2019 | Bachar | G02B 7/09 |
| 2020/0084308 A1 * | 3/2020 | Yoon | H04N 23/55 |
| 2020/0363614 A1 | 11/2020 | Kwon et al. | |
| 2020/0363626 A1 | 11/2020 | Seo et al. | |
| 2020/0396358 A1 | 12/2020 | Park et al. | |
| 2022/0014611 A1 * | 1/2022 | Yoon | G02B 13/0035 |
| 2024/0319471 A1 * | 9/2024 | Kwon | G02B 7/021 |
| 2024/0319472 A1 * | 9/2024 | Kwon | G03B 17/12 |
| 2024/0337806 A1 * | 10/2024 | Kwon | G03B 17/12 |

FOREIGN PATENT DOCUMENTS

| | | | |
|---|---|---|---|
| CN | 104280976 A | | 1/2015 |
| CN | 105556385 A | | 5/2016 |
| CN | 107918183 A | | 4/2018 |
| CN | 108459451 A | | 8/2018 |
| GB | 2551860 A | | 1/2018 |
| JP | 3852073 B2 | | 11/2006 |
| JP | 2006-350127 A | | 12/2006 |
| JP | 2012-118336 A | | 6/2012 |
| JP | 2014-66772 A | | 4/2014 |
| JP | 2015-11353 A | | 1/2015 |
| JP | 2016-48295 A | | 4/2016 |
| KR | 10-2009-0084483 A | | 8/2009 |
| KR | 10-2010-0026882 A | | 3/2010 |
| KR | 10-2015-0091010 A | | 8/2015 |
| KR | 10-2015-0118012 A | | 10/2015 |
| KR | 10-2018-0003539 A | | 1/2018 |
| WO | WO 2015/021279 A1 | | 2/2015 |
| WO | WO 2017/208090 A1 | | 12/2017 |

OTHER PUBLICATIONS

U.S. Appl. No. 17/536,449, filed Nov. 29, 2021, Im et al, Samsung Electro-Mechanics Co., Ltd.
Chinese Office Action issued on Feb. 27, 2020, in counterpart Chinese Patent Application No. 201810127401.1 (16 pages in English and 12 pages in Chinese).
Chinese Office Action issued on May 5, 2022, in counterpart Chinese Patent Application No. 202011281995.5 (16 pages in English and 9 pages in Chinese).
Korean Office Action issued on Oct. 22, 2018, in corresponding Korean Patent Application No. 10-2017-0049048 (9 pages in English and 6 pages in Korean).
Korean Office Action issued on Apr. 10, 2019, in counterpart Korean Patent Application No. 10-2017-0049048 (6 pages in English and 4 pages in Korean).
Korean Office Action issued on Jun. 8, 2020, in related Korean Patent Application No. 10- 2020-0009968 (7 pages in English, 6 pages in Korean).
Korean Office Action issued on Jul. 22, 2021, in counterpart Korean Patent Application No. 10-2021-0048574 (6 pages in English and 5 pages in Korean).
Korean Office Action Issued on Apr. 2, 2025, in Counterpart Korean Patent Application No. 10-2024-0025885 (6 Pages in English, 5 Pages in Korean).

* cited by examiner

REFLECTING MODULE FOR OPTICAL IMAGE STABILIZATION (OIS) AND CAMERA MODULE INCLUDING THE SAME

CROSS-REFERENCE TO RELATED APPLICATIONS

This application is a continuation of U.S. patent application Ser. No. 17/536,449 filed on Nov. 29, 2021, which is a continuation of U.S. patent application Ser. No. 16/861,358 filed on Apr. 29, 2020, now U.S. Pat. No. 11,262,593 issued on Mar. 1, 2022, which is a continuation of U.S. patent application Ser. No. 15/854,578 filed on Dec. 26, 2017, now U.S. Pat. No. 10,678,062 issued on Jun. 9, 2020, which claims the benefit under 35 USC 119(a) of Korean Patent Application Nos. 10-2017-0017527 filed on Feb. 8, 2017, and 10-2017-0049048 filed on Apr. 17, 2017, in the Korean Intellectual Property Office, the entire disclosures of which are incorporated herein by reference for all purposes.

BACKGROUND

1. Field

This application relates to a reflecting module for optical image stabilization (OIS) and a camera module including the same.

2. Description of Related Art

Camera modules have become a standard feature of portable electronic devices such as tablet personal computers (PCs), laptop PCs, and smartphones, and an autofocusing function, an optical image stabilization (OIS) function, and a zoom function are some of the functions that have been implemented in camera modules for mobile terminals.

However, in order to implement such functions, the structures of such camera modules have become relatively complicated and the sizes thereof have increased, making it difficult to mount such camera modules in portable electronic devices.

In addition, when a lens or an image sensor is directly moved for the purpose of optical image stabilization, both a weight of the lens or of the image sensor itself and weights of other components to which the lens or the image sensor is attached should be considered, and a predetermined level or more of driving force is thus required, resulting in increased power consumption.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a reflecting module for optical image stabilization (OIS) includes a housing; a rotation holder provided in the housing and including a reflecting member; a rotation plate provided in the housing between an inner wall of the housing and the rotation holder so that the rotation holder is supported by the inner wall of the housing via the rotation plate; and a driving part configured to apply a driving force to the rotation holder to move the rotation holder.

The rotation plate may be rotatable with respect to the housing around a first axis substantially perpendicular to an optical axis, and the rotation holder may be rotatable with respect to the rotation plate around a second axis substantially perpendicular to the optical axis and the first axis.

In response to the rotation plate being rotated around the first axis, the rotation holder may rotate with the rotation plate, and in response to the rotation holder being rotated around the second axis, the rotation holder may rotate relative to the rotation plate.

The rotation plate may include first balls aligned in a first axis direction provided on a surface of the rotation plate facing the inner wall of the housing; and second balls aligned in a second axis direction perpendicular to the first axis direction provided on a surface of the rotation plate facing the rotation holder.

The reflecting module for OIS may further include first bearings aligned along a first axis substantially perpendicular to an optical axis provided between the rotation plate and the housing; and second bearings aligned along a second axis substantially perpendicular to the optical axis and the first axis provided between the rotation holder and the rotation plate.

The rotation plate may be rotatable around the first axis, and the rotation holder may be rotatable around the second axis.

The first bearings may be fixed to, or freely movable relative to, the rotation plate or the housing, and the second bearings may be fixed to, or freely movable relative to, the rotation plate or the rotation holder.

The first bearings and the second bearings may have a spherical shape or a spherical cap shape obtained by cutting a sphere with a plane.

The reflecting module for OIS may further include at least one first bearing having a cylindrical shape or a semi-cylindrical shape provided between the rotation plate and the housing and elongated along a first axis substantially perpendicular to an optical axis; and at least one second bearing having a cylindrical shape or a semi-cylindrical shape provided between the rotation holder and the rotation plate and elongated along a second axis substantially perpendicular to the optical axis and the first axis.

The reflecting module for OIS may further include a pulling magnet provided on one of the housing and the rotation holder; and a pulling yoke provided on a remaining one of the housing and the rotation holder; wherein the rotation holder may be supported by the inner wall of the housing via the rotation plate by an attractive force between the pulling magnet and the pulling yoke.

In another general aspect, a camera module includes a lens module including lenses; and the reflecting module for OIS described above provided in front of the lens module to change a path of light incident into the reflecting module for OIS so that the light having the changed path is directed toward the lens module.

In another general aspect, a reflecting module for optical image stabilization (OIS) includes a housing; a rotation holder provided in the housing and including a reflecting member and being supported by an inner wall of the housing; bearings aligned in a first axis direction substantially perpendicular to an optical axis direction provided between the housing and the rotation holder; and a driving part configured to apply a driving force to the rotation holder to move the rotation holder.

The bearings may be balls.

The rotation holder may be rotatable around substantially a first axis, and the rotation holder may be rotatable around a second axis perpendicular to an optical axis and the first axis.

In response to the rotation holder being rotated around the second axis, the rotation holder may slide on surfaces of the bearings.

In response to the rotation holder being rotated around the second axis, a rotation axis of the rotation holder may be formed at a portion spaced apart from the bearings toward the rotation holder by a predetermined distance.

In response to the rotation holder being rotated around the second axis, the rotation holder may be moved from a contact portion between the rotation holder and the bearings in the first axis direction.

The reflecting module for OIS may further include a pulling magnet provided on one of the housing and the rotation holder; and a pulling yoke provided on a remaining one of the housing and the rotation holder; wherein the rotation holder may be supported by the inner wall of the housing by an attractive force between the pulling magnet and the pulling yoke.

The housing or the rotation holder may be provided with seating grooves, and the bearings may be fixed to, or freely movable relative to, the housing or the rotation holder provided with the seating grooves.

A rotation protrusion may be provided on one of a surface of the housing facing the rotation holder and a surface of the rotation holder facing the housing, a rotation recess may be provided in a remaining one of the surface of the housing facing the rotation holder and the surface of the rotation holder facing the housing, and the bearings may be provided between the rotation protrusion and the rotation recess.

Edges of the rotation protrusion and the rotation recess may be inclined surfaces or round surfaces.

The rotation protrusion or the rotation recess may be provided with seating grooves elongated in a direction substantially perpendicular to a direction in which the bearings are arranged, and the bearings may be disposed in the seating grooves.

A cross section of the seating grooves may have a round shape or a polygonal shape.

In another general aspect, a camera module includes a lens module including lenses; and the reflecting module for OIS described above provided in front of the lens module to change a path of light incident into the reflecting module for OIS so that the light having the changed path is directed toward the lens module.

In another general aspect, a reflecting module for optical image stabilization (OIS) module includes a housing; a rotation holder supported in the housing by friction; a reflecting member disposed on the rotation holder; and a driving part configured to rotate the rotation holder relative to the housing.

The reflecting module for OIS may further include a rotation plate disposed between an inner wall of the housing and the rotation holder; first bearings arranged in a direction of a first axis and disposed between the inner wall of the housing and the rotation plate; and second bearings arranged in a direction of a second axis substantially perpendicular to the first axis and disposed between the rotation plate and the rotation holder; wherein the driving part may be further configured to rotate the rotation plate around the first axis, and rotate the rotation holder around the second axis.

The reflecting module for OIS may further include a rotation recess provided in one of an inner wall of the housing facing the rotation holder and a surface of the rotation holder facing the inner wall of the housing; and a rotation protrusion provided on a remaining one of the inner wall of the housing and the surface of the rotation holder facing the inner wall of the housing and engaging the rotation recess; wherein the rotation recess and the rotation protrusion have respective shapes that limit rotation of the rotation holder to rotation around a first axis and a second axis substantially perpendicular to the first axis, and the driving part may be further configured to rotate the rotation holder about the first axis and the second axis.

The reflecting module for OIS may further include seating grooves provided in one of a surface of the rotation recess facing the rotation protrusion and a surface of the rotation protrusion facing the rotation recess; and bearings arranged in a direction of one of the first axis and the second axis and disposed in the seating grooves; wherein the seating grooves are elongated in a direction of a third axis substantially perpendicular to the first axis and the second axis.

In another general aspect, a reflecting module for optical image stabilization (OIS) includes a housing; a rotation holder disposed in the housing; a reflecting member disposed on the rotation holder; a driving part configured to rotate the rotation holder relative to the housing; a pulling magnet disposed on one of the housing and the rotation holder; and a pulling yoke disposed on a remaining one of the housing and the rotation holder; wherein the rotation holder is pressed against an inner wall of the housing by an attractive force between the pulling magnet and the pulling yoke.

The reflecting module for OIS may further include a rotation plate disposed between the inner wall of the housing and the rotation holder; first bearings arranged in a direction of a first axis and disposed between the inner wall of the housing and the rotation plate; and second bearings arranged in a direction of a second axis substantially perpendicular to the first axis and disposed between the rotation plate and the rotation holder; wherein the driving part may be further configured to rotate the rotation plate around the first axis, and rotate the rotation holder around the second axis.

The reflecting module for OIS may further include a rotation recess provided in one of the inner wall of the housing and a surface of the rotation holder facing the inner wall of the housing; and a rotation protrusion provided on a remaining one of the inner wall of the housing and the surface of the rotation holder facing the inner wall of the housing and engaging the rotation recess; wherein the rotation recess and the rotation protrusion have respective shapes that limit rotation of the rotation holder to rotation around a first axis and a second axis substantially perpendicular to the first axis, and the driving part may be further configured to rotate the rotation holder about the first axis and the second axis.

The reflecting module for OIS may further include seating grooves provided in one of a surface of the rotation recess facing the rotation protrusion and a surface of the rotation protrusion facing the rotation recess; and bearings arranged in a direction of one of the first axis and the second axis and disposed in the seating grooves; wherein the seating grooves are elongated in a direction of a third axis substantially perpendicular to the first axis and the second axis.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
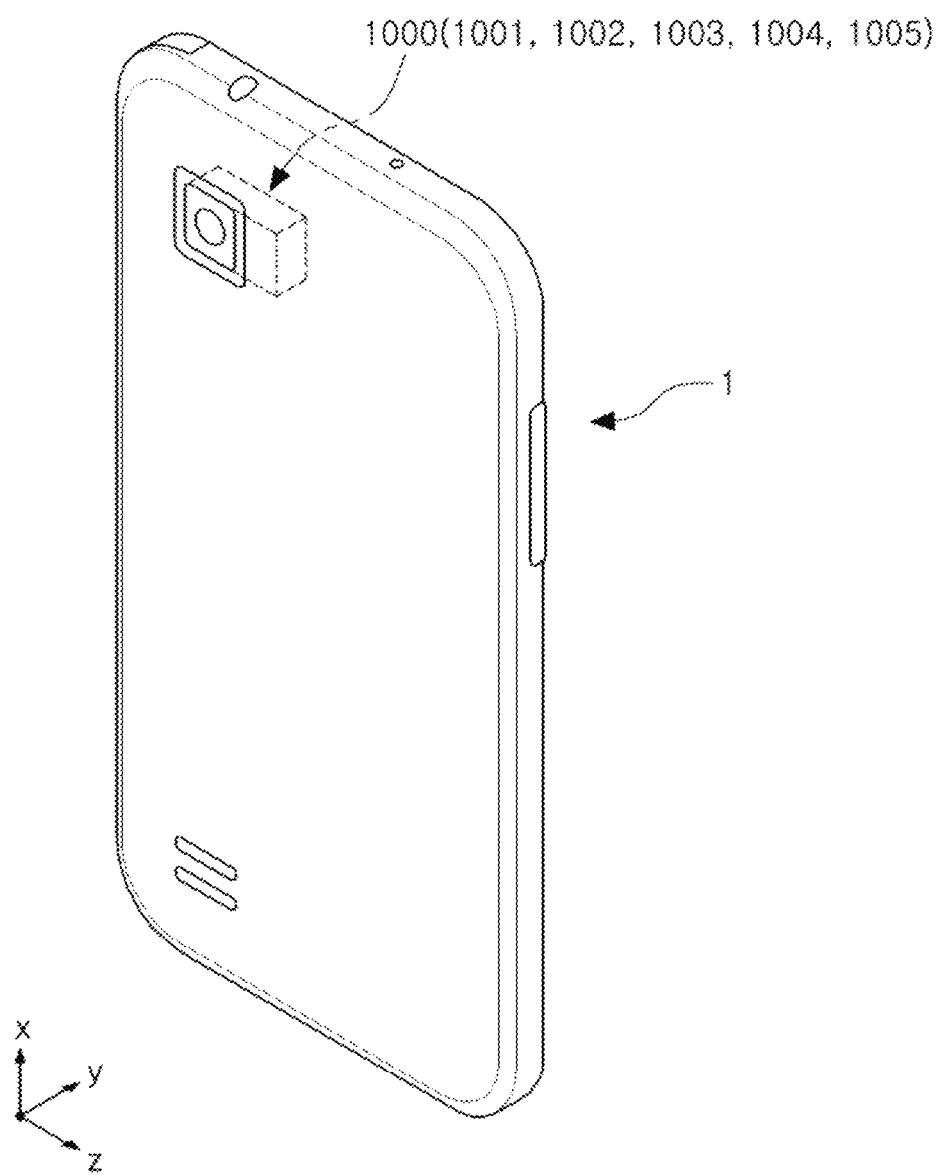
FIG. 1 is a perspective view illustrating an example of a portable electronic device.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

FIG. 1 is a perspective view illustrating an example of a portable electronic device.

Referring to FIG. 1, a portable electronic device 1 may be a portable electronic device such as a mobile communications terminal, a smartphone, or a tablet personal computer (PC) in which a camera module 1000, 1001, 1002, 1003, 1004, or 1005 is mounted.

As illustrated in FIG. 1, the portable electronic device 1 includes the camera module 1000 to capture an image of a subject.

In this example, the camera module 1000, 1001, 1002, 1003, 1004, or 1005 includes lenses, and an optical axis (a Z axis) of each of the lenses is oriented in a direction perpendicular to a thickness direction of the portable electronic device 1 (a Y-axis direction or a direction from a front surface of the portable electronic device 1 to a rear surface thereof, or an opposite direction from the rear surface of the portable electronic device 1 to the front surface thereof).

For example, the optical axis (the Z axis) of each of the lenses included in the camera module 1000 may be formed in a width direction or a length direction (an X-axis direction or a Z-axis) direction) of the portable electronic device 1.

Therefore, even in the case that the camera module 1000 has functions such as an autofocusing (AF) function, a zoom function, and an optical image stabilization (OIS) function, a thickness of the portable electronic device 1 will not be increased. Therefore, the portable electronic device 1 may be miniaturized.

In this example, the camera module 1000 has any one or any combination of any two or more of the AF function, the zoom function, and the OIS function.

Since the camera module 1000 including the AF function, the zoom function, and the OIS function needs additional components to implement these functions, a size of the camera module will be increased compared to a camera module that does not include these functions.

When the size of the camera module 1000 is increased, it may be difficult to miniaturize the portable electronic device 1 in which the camera module 1000 is mounted.

For example, when the number of stacked lenses in the camera module is increased for the purpose of the zoom function and the stacked lenses are provided in the camera module in the thickness direction of the portable electronic device 1, a thickness of the portable electronic device may also be increased depending on the number of stacked lenses. Therefore, when the thickness of the portable electronic device 1 is not increased, the number of stacked lenses is limited by the thickness of the portable electronic device 1, such that a zoom performance may be deteriorated.

In addition, an actuator moving a lens group in an optical axis direction or a direction perpendicular to the optical axis needs to be installed in order to implement the AF function and the OIS function, and when the optical axis (the Z axis) of the lens group is oriented in the thickness direction of the portable electronic device 1, the actuator moving the lens group also needs to be installed in the thickness direction of the portable electronic device 1. Therefore, a thickness of the portable electronic device 1 is increased.

However, in the camera module 1000 of this example, the optical axis (the Z axis) of each of the lenses is oriented perpendicularly to the thickness direction of the portable electronic device 1. Therefore, even in the case that the camera module 1000 having the AF function, the zoom function, and the OIS function is mounted in the portable electronic device 1, the portable electronic device 1 may be miniaturized.

Figure 2:
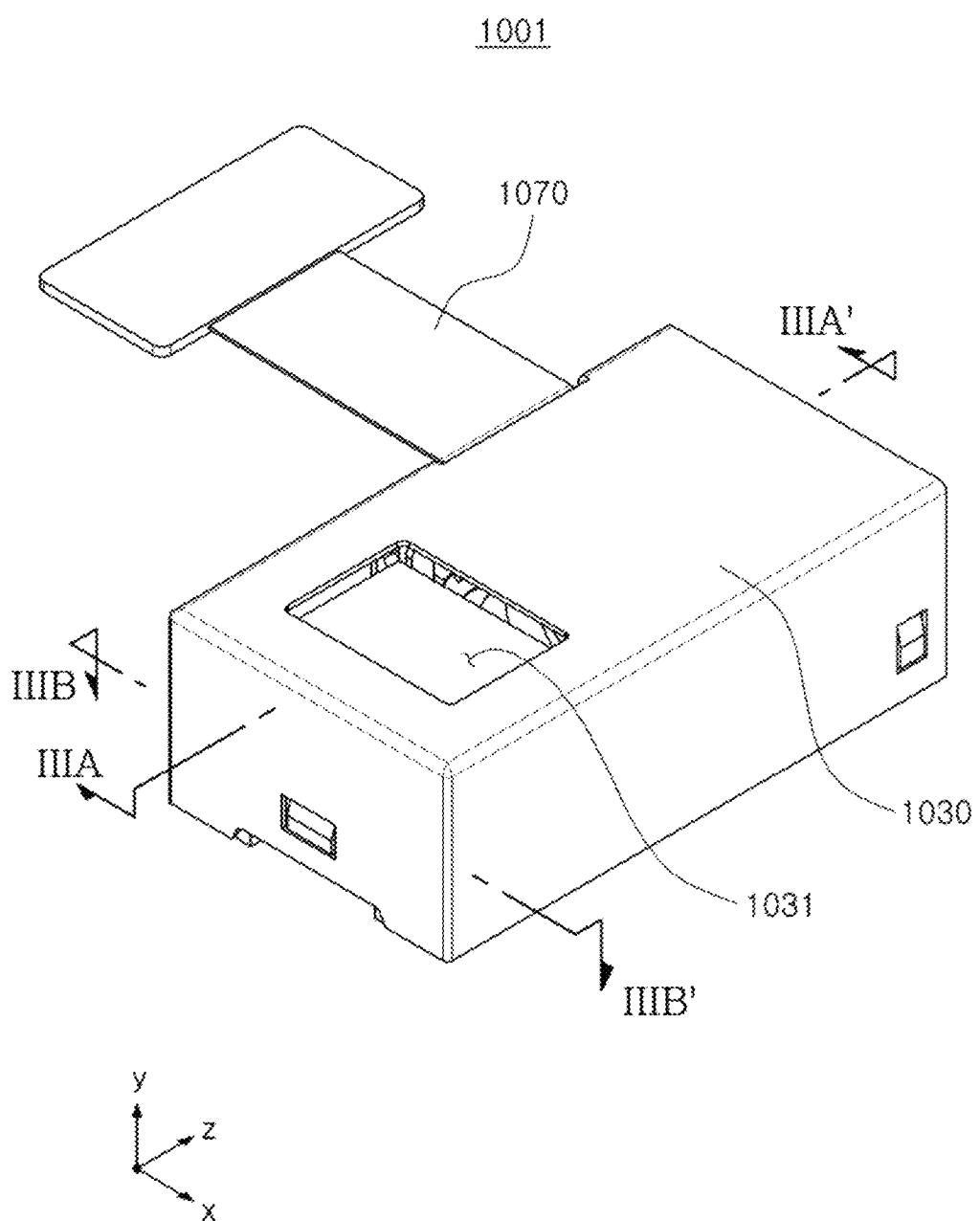
FIG. 2 is a perspective view illustrating an example of a camera module.
Figure 3A:
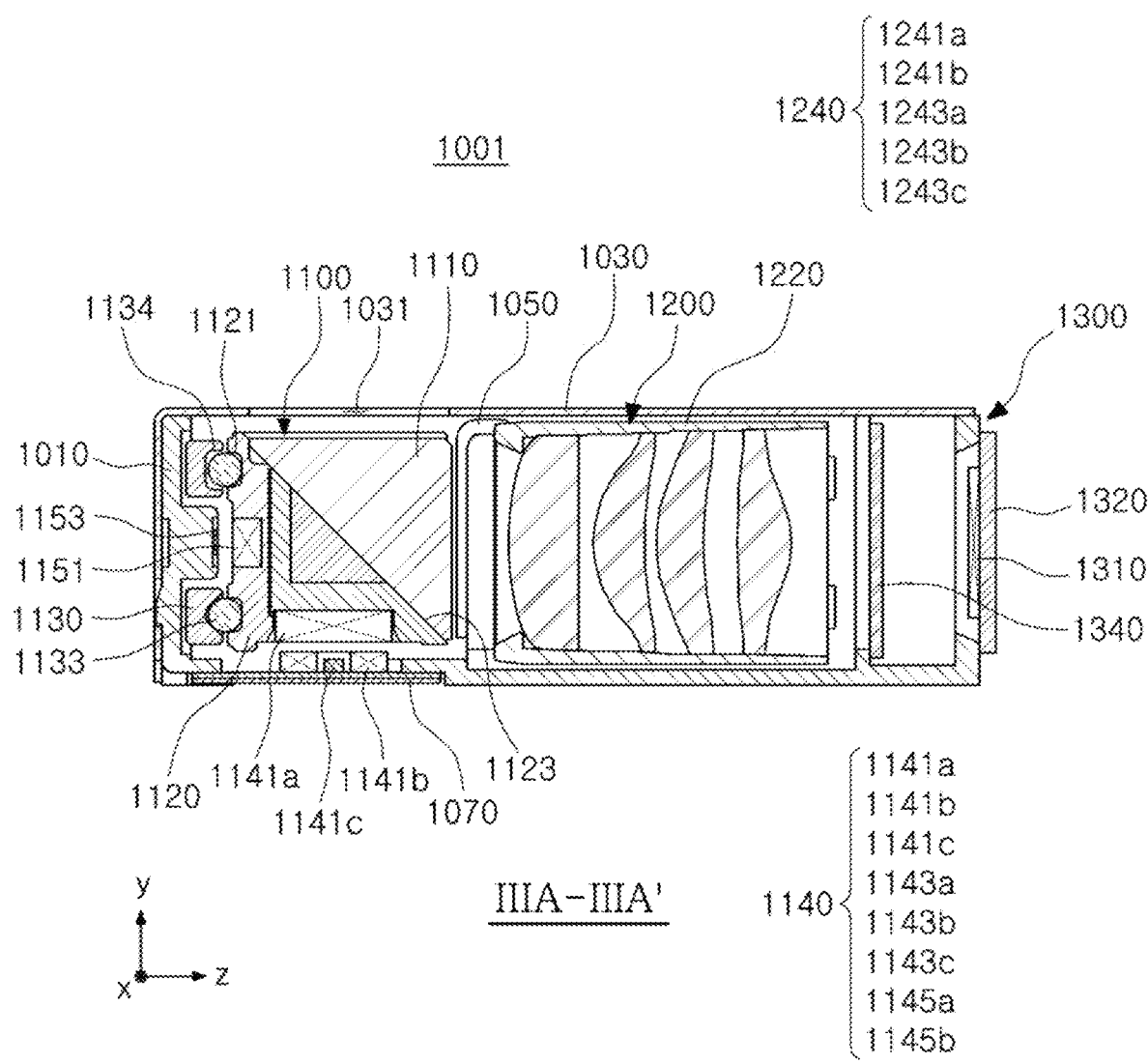
FIGS. 3A and 3B are cross-sectional views taken along the lines IIIA-IIIA' and IIIB-IIIB' in FIG. 2 illustrating the camera module of FIG. 2.
Figure 3B:
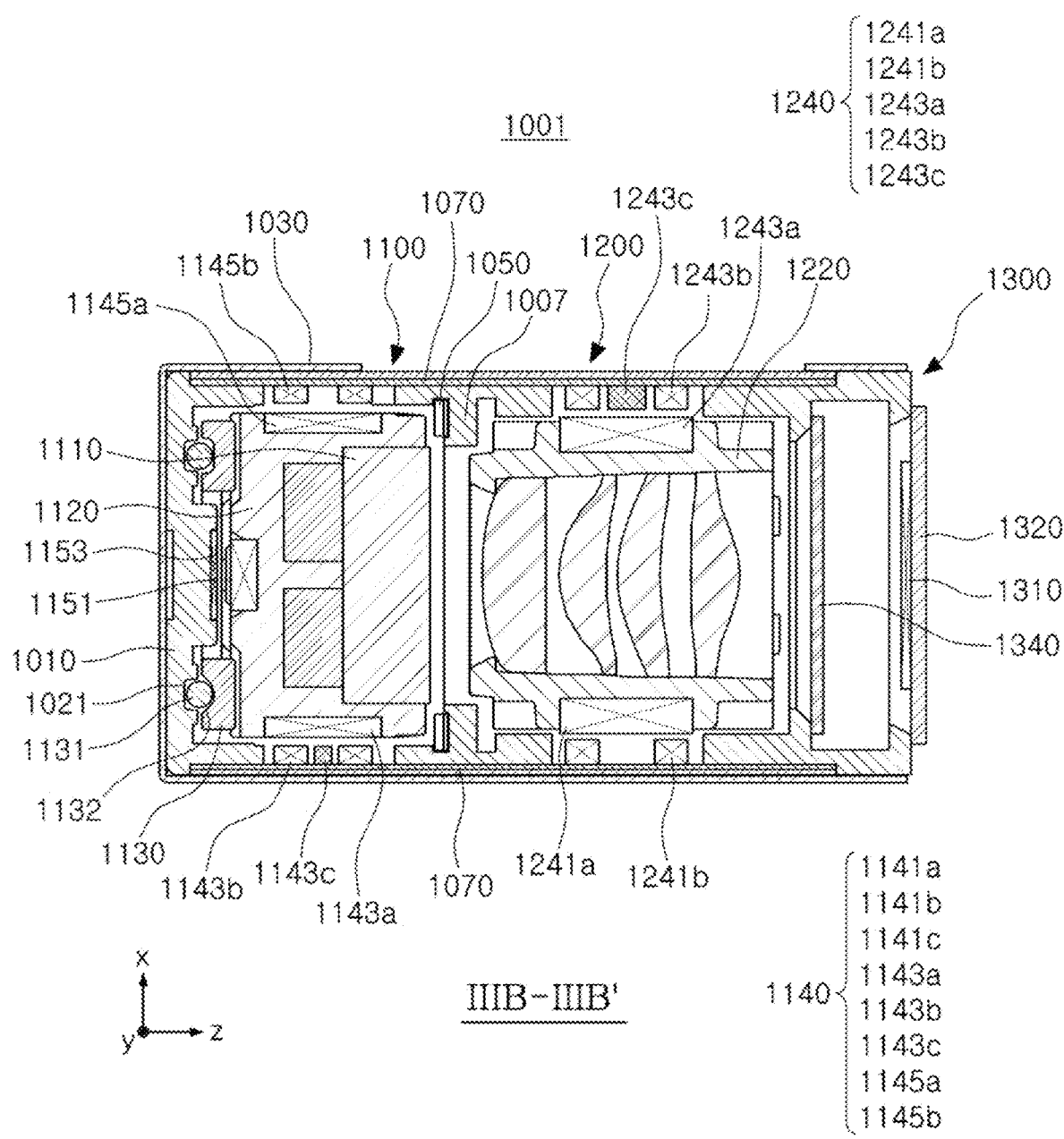
Figure 4:
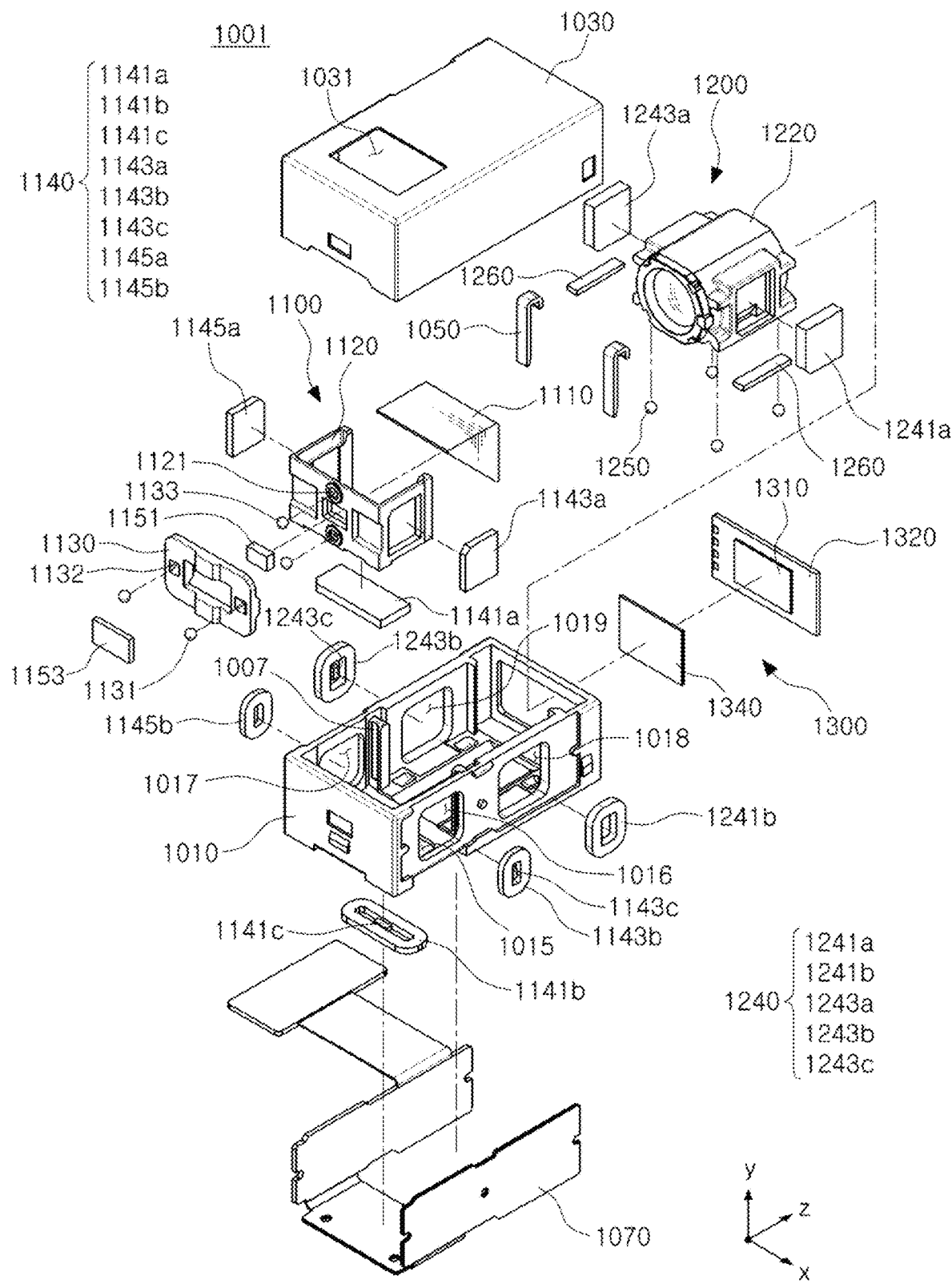
FIG. 4 is an exploded perspective view illustrating the camera module of FIG. 2.
Figure 5:
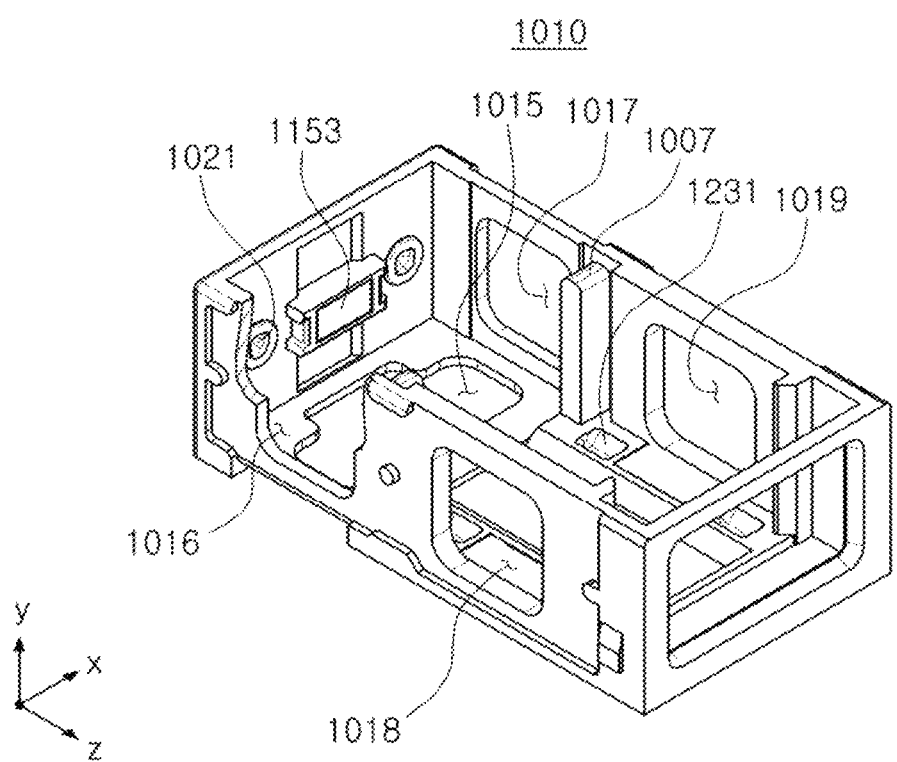
FIG. 5 is a perspective view illustrating a housing of the camera module of FIG. 2.

FIG. 2 is a perspective view illustrating an example of a camera module, and FIGS. 3A and 3B are cross-sectional views taken along the lines IIIA-IIIA' and IIIB-IIIB' in FIG. 2 illustrating the camera module of FIG. 2.

Referring to FIGS. 2 through 3B, a camera module 1001 includes a reflecting module 1100, a lens module 1200, and an image sensor module 1300 provided in a housing 1010.

The reflecting module 1100 changes a path of light. For example, a path of light incident through an opening 1031 (see FIG. 3A) of a cover 1030 covering an upper portion of the camera module 1001 is changed by the reflecting module 1100 so that the light is directed toward the lens module 1200. To this end, the reflecting module 1100 includes a reflecting member 1110 reflecting the light.

A path of the light incident through the opening 1031 is changed by the reflecting module 1100 so that the light is directed toward the lens module 1200. For example, a path of light incident in the thickness direction (the Y-axis direction) of the camera module 1001 is changed by the reflecting module 1100 to substantially coincide with the optical axis direction (the Z-axis direction).

The lens module 1200 includes lenses through which the light having the path changed by the reflecting module 1100 passes. The image sensor module 1300 includes an image sensor 1310 converting the light passing through the lenses into an electrical signal, a printed circuit board 1320 on which the image sensor 1310 is mounted, and an optical filter 1340 filtering the light incident thereon from the lens module 1200. The optical filter 1340 may be an infrared cut-off filter.

In an internal space of the housing 1010, the reflecting module 1100 is provided in front of the lens module 1200, and the image sensor module 1300 is provided behind the lens module 1200.

Referring to FIGS. 2 through 10, the camera module 1001 includes the reflecting module 1100, the lens module 1200, and the image sensor module 1300 provided in the housing 1010.

The reflecting module 1100, the lens module 1200, and the image sensor module 1300 are sequentially provided in the housing 1010 from one side of the housing 1010 to the other side of the housing 1010. The housing 1010 has the internal space in which the reflecting module 1100, the lens module 1200, and the image sensor module 1300 are provided. in this example, the printed circuit board 1320 included in the image sensor module 1300 is attached to an outer surface of the housing 1010. In this example, the housing 1010 is a single housing and both of the reflecting module 1100 and the lens module 1200 are provided in the internal space of the housing 1010. However, the housing 1010 is not limited thereto. For example, two separate housings in which the reflecting module 1100 and the lens module 1200 are respectively provided may be connected to each other.

In addition, the housing 1010 is covered by the cover 1030 so that the internal space of the housing 1010 is not visible.

The cover 1030 has the opening 1031 through which light is incident, and a path of the light incident through the opening 1031 is changed by the reflecting module 1110 so that the light is incident on the lens module 1200. In the example illustrated in the drawings, the cover 1030 is a single cover covering the entire housing 1010. In another example, two separate covers respectively covering the reflecting module 1100 and the lens module 1200 may be provided.

The reflecting module 1100 includes the reflecting member 1110 reflecting the light. In addition, the light incident to the lens module 1200 passes through the lenses and is then converted into the electrical signal by the image sensor 1310.

The housing 1010 includes the reflecting module 1100 and the lens module 1200 provided in the internal space thereof. Therefore, in the internal space of the housing 1010, a space in which the reflecting module 1100 is provided and a space in which the lens module 1200 is provided are delineated from each other by protruding walls 1007. In addition, the reflecting module 1100 is provided in front of the protruding walls 1007, and the lens module 1200 is provided behind the protruding walls 1007. The protruding walls 1007 protrude from opposite sidewalls of the housing 1010 into the internal space.

The reflecting module 1100 provided in front of the protruding walls 1007 has a structure in which a rotation holder 1120 is held against and supported by an inner wall surface of the housing 1010 by an attractive force between a pulling yoke 1153 provided on the inner wall surface of the housing 1010 and a pulling magnet 1151 provided on the rotation holder 1120. Alternatively, although not illustrated in the drawings, the pulling magnet 1151 may be provided on the inner wall surface of the housing 1010, and the pulling yoke 1153 may be provided on the rotation holder 1120. However, the structure illustrated in the drawings will hereinafter be described for convenience of explanation.

In addition, first ball bearings 1131, a rotation plate 1130, and second ball bearings 1133 are provided between the inner wall surface of the housing 1010 and the rotation holder 1120. Since the first ball bearings 1131 and the second ball bearings 1133 are held in the seating grooves 1132, 1134, 1021, and 1121 while being partially inserted into the seating grooves 1132, 1134, 1021, and 1121 as described below, when the rotation holder 1120 and the rotation plate 1130 are inserted into the internal space of the housing 1010, a slight space may need to be provided between the rotation holder 1120 and the protruding walls 1007, and after the rotation holder 1120 is mounted in the housing 1010, the rotation holder 1120 is held against the inner wall surface of the housing 1010 and the first ball bearings 1131 and the second ball bearings 1133 are held in the seating grooves 1132, 1134, 1021, and 1121 by the attractive force between the pulling yoke 1153 and the pulling magnet 1151, and a slight space may thus remain between the rotation holder 1120 and the protruding walls 1007.

Therefore, in this example, the housing 1010 includes stoppers 1050 fitted onto the protruding walls 1007 while supporting the rotation holder 1120 and having a hook shape (even in the case that the stoppers 1050 are not provided, the rotation holder 1120 may be fixed to the housing by the attractive force between the pulling magnet 1151 and the pulling yoke 1153). In this example, the stoppers 1050 have the hook shape, and support the rotation holder 1120 in a state in which hook portions thereof are hooked onto the protruding walls 1007. The stoppers 1050 serve as brackets supporting the rotation holder 1120 when the reflecting module 1100 is not driven, and additionally serve as the stoppers 1050 limiting movement of the rotation holder 1120 when the reflecting module 1100 is driven. The stoppers 1050 are respectively provided on the protruding walls 1007 protruding from the opposite sidewalls of the housing. A space is provided between the stoppers 1050 and the rotation holder 1120 so that the rotation holder 1120 is smoothly rotated. Alternatively, the stoppers 1050 may be formed of an elastic material to allow the rotation holder 1120 to be smoothly moved in a state in which the rotation holder 1120 is supported by the stoppers 1050.

In addition, the housing 1010 includes a first driving part 1140 and a second driving part 1240 provided to respectively drive the reflecting module 1100 and the lens module 1200. The first driving part 1140 includes coils 1141b, 1143b, and 1145b for driving the reflecting module 1100, and the second driving part 1240 includes coils 1241b and 1243b for driving the lens module 1200. In addition, since the coils 1141b, 1143b, 1145b, 1241b, and 1243b are provided in the housing 1010 in a state in which they are mounted on a main board 1070, the housing 1010 is provided with through-holes 1015, 1016, 1017, 1018, and 1019 so that the coils 1141b, 1143b, 1145b, 1241b, and 1243b are exposed to the internal space of the housing 1010.

In the example illustrated in the drawings, the main board 1070 on which the coils 1141b, 1143b, 1145b, 1241b, and 1243b are mounted is a single board. In this case, one set of terminals may be provided, and connection of an external power supply and signals may thus be easy. However, the main board 1070 is not limited thereto, but may also be provided as two boards by separating a board on which the coils 1141b, 1143b, and 1145b of the reflecting module 1100 are mounted from a board on which the coils 1241b and 1243b of the lens module 1200 are mounted.

The reflecting module 1100 changes the path of the light incident thereto through the opening 1031. When a still image or a moving image is captured, the still image may be blurred or the moving image may be shaken due to a hand-shake or other movement of a user. In this case, the reflecting module 1100 corrects the hand-shake or other movement of the user by moving the rotation holder 1120 on which the reflecting member 1110 is mounted to perform an OIS function. For example, when shaking is generated at the time of capturing the still image or the moving image due to the hand-shake or other movement of the user, a relative displacement corresponding to the shaking may be provided to the rotation holder 1120 to compensate for the shaking.

In this example, the OIS function is implemented by the movement of the rotation holder 1120 having a relatively low weight since it does not include lenses or other components, and thus power consumption for the OIS function is significantly reduced.

That is, in this example, the light on which the OIS is performed is incident to the lens module 1200 by changing the path of the light by the movement of the rotation holder 1120 on which the reflecting member 1110 is provided without moving a lens holder including the lenses or the image sensor in order to implement the OIS function.

The reflecting module 1100 includes the rotation holder 1120 provided in the housing 1010 and supported by the housing 1010, the reflecting member 1110 mounted on the rotation holder 1120, and the first driving part 1140 moving the rotation holder 1120.

The reflecting member 1110 changes the path of the light. For example, the reflecting member 1110 may be a mirror or a prism reflecting the light (a case in which the reflecting member 1110 is the prism is illustrated in the drawings associated with the camera module 1001 of FIGS. 2 through 10 for convenience of explanation).

The reflecting member 1110 is fixed to the rotation holder 1120. The rotation holder 1120 has a mounting surface 1123 on which the reflecting member 1110 is mounted.

The mounting surface 1123 of the rotation holder 1120 is an inclined surface so that the path of the light is changed. In one example, the mounting surface 1123 is an inclined surface inclined with respect to the optical axis (the Z axis) of each of the lenses by 30° to 60°. In addition, the inclined surface of the rotation holder 1120 is directed toward the opening 1031 of the cover 1030 through which the light is incident.

The rotation holder 1120 on which the reflecting member 1110 is mounted is movably mounted in the internal space of the housing 1010. For example, the rotation holder 1120 is mounted in the housing 1010 to be rotatable around a first axis (an X axis) and a second axis (a Y axis). In this example, the first axis (the X axis) and the second axis (the Y axis) are axes that are perpendicular to the optical axis (the Z axis), and are perpendicular to each other.

The rotation holder 1120 is supported in the housing 1010 by the first ball bearings 1131 aligned along the first axis (the X axis) and the second ball bearings 1133 aligned along the second axis (the Y axis) so that the rotation holder 1120 can be smoothly rotated around the first axis (the X axis) and the second axis (the Y axis). In the drawings, two first ball bearings 1131 aligned along the first axis (the X axis) and two second ball bearings 1133 aligned along the second axis (the Y axis) are illustrated by way of example. In addition, the rotation holder 1120 is rotated around the first axis (the X axis) and the second axis (the Y axis) by a first driving part 1140 to be described below.

Figure 6A:
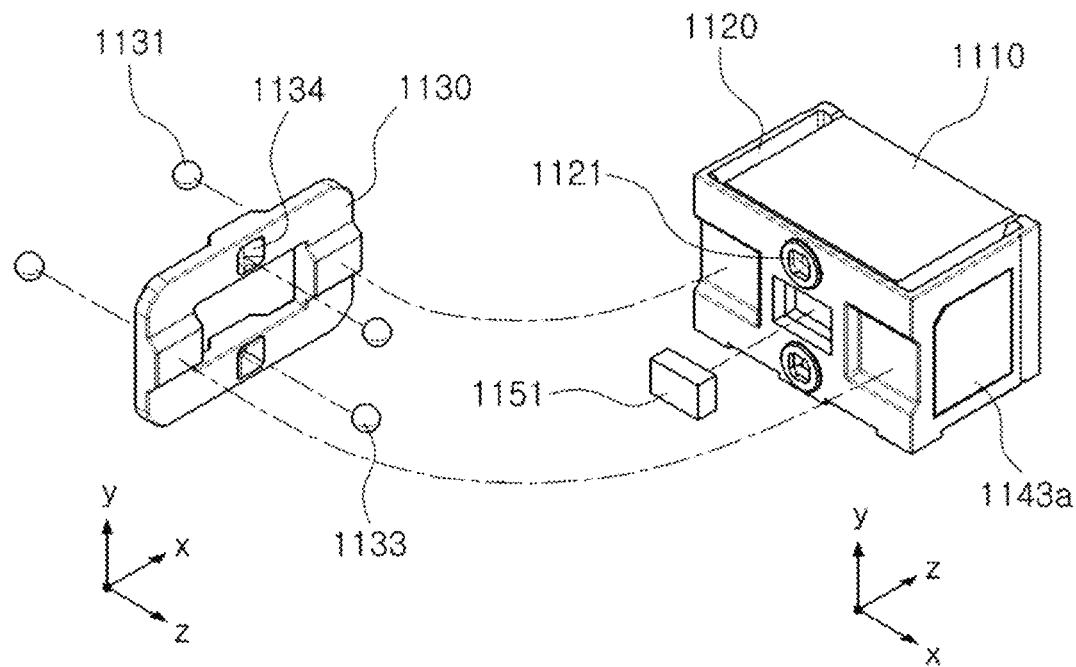
FIGS. 6A and 6B are exploded perspective views illustrating examples of a rotation plate and a rotation holder of the camera module of FIG. 2.
Figure 6B:
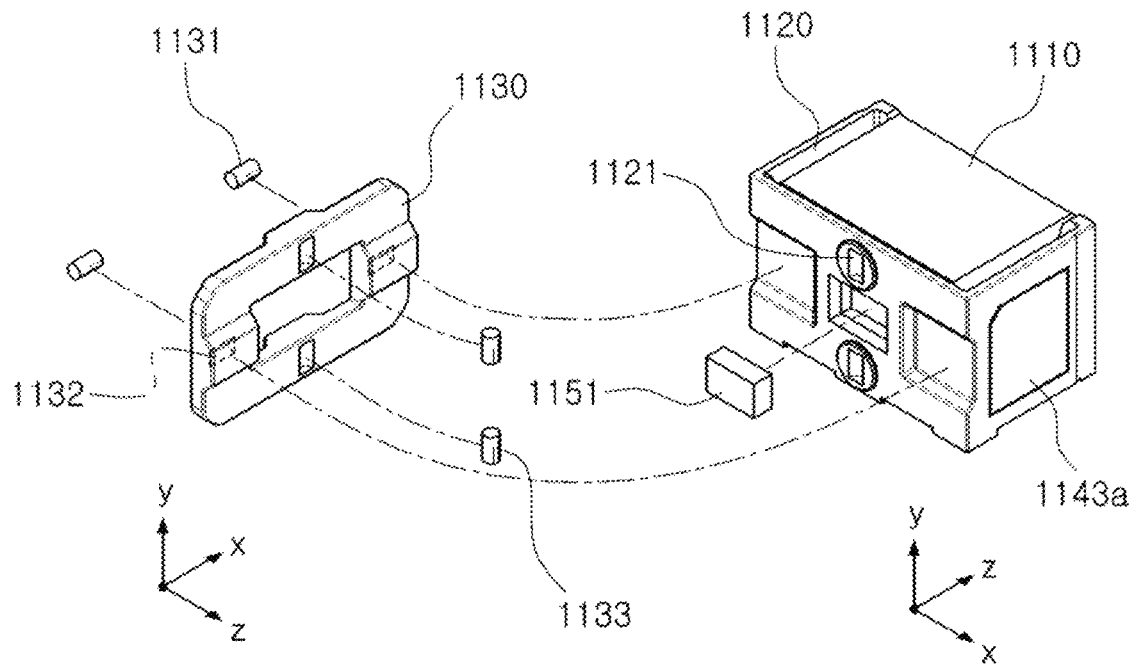
Figure 7:
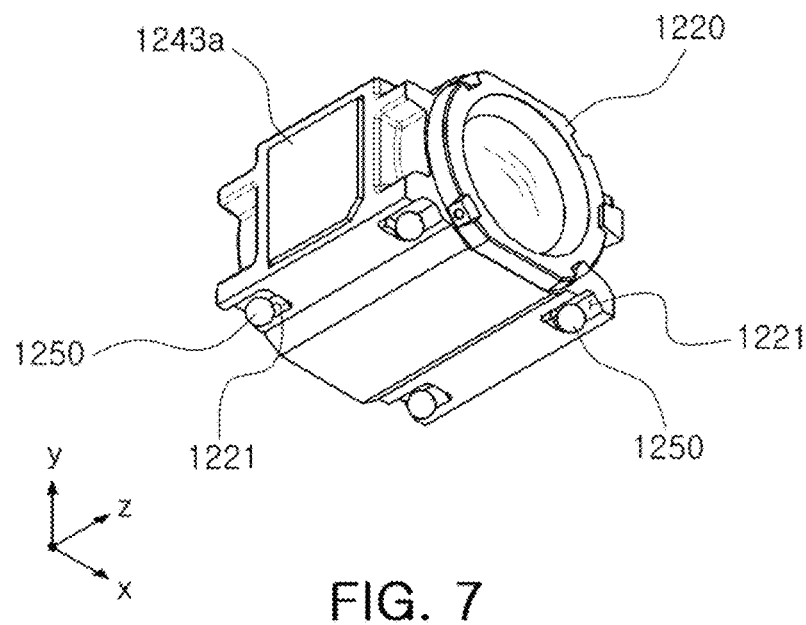
FIG. 7 is a perspective view illustrating a lens holder of the camera module of FIG. 2.
Figure 8:
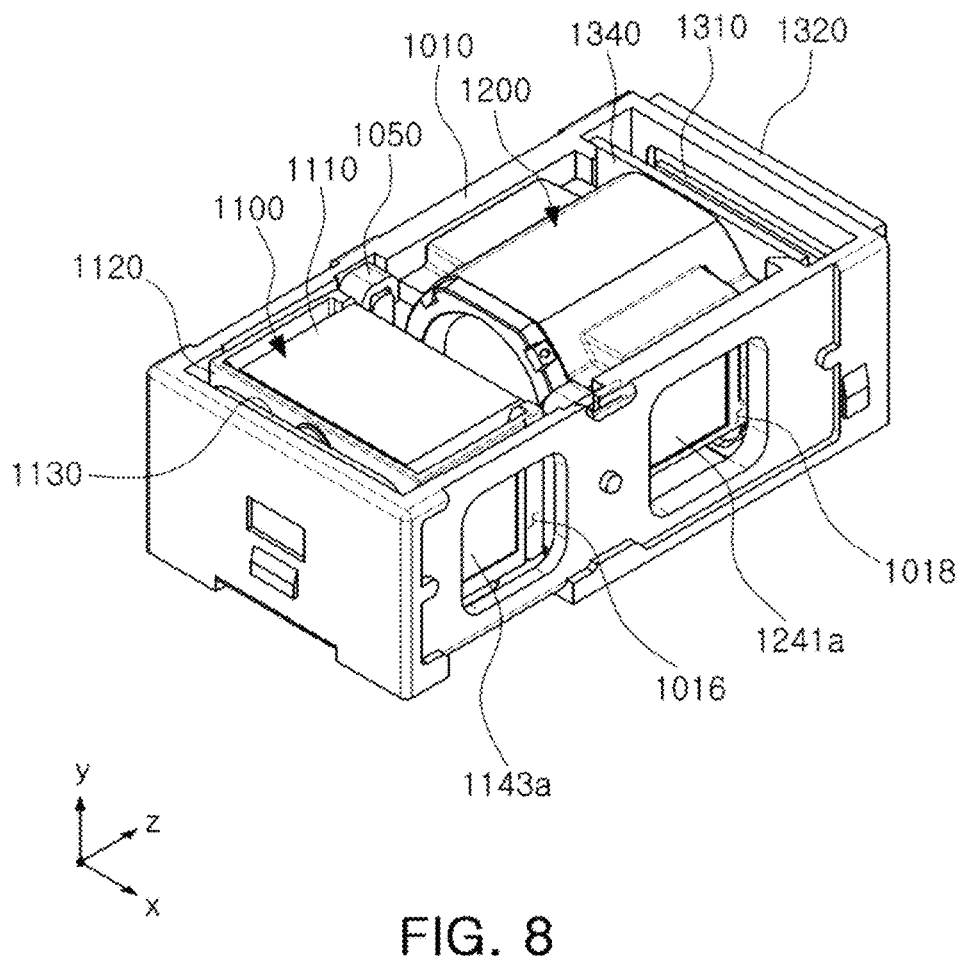
FIG. 8 is an assembled perspective view illustrating components other than a cover in the camera module of FIG. 2.
Figure 9:
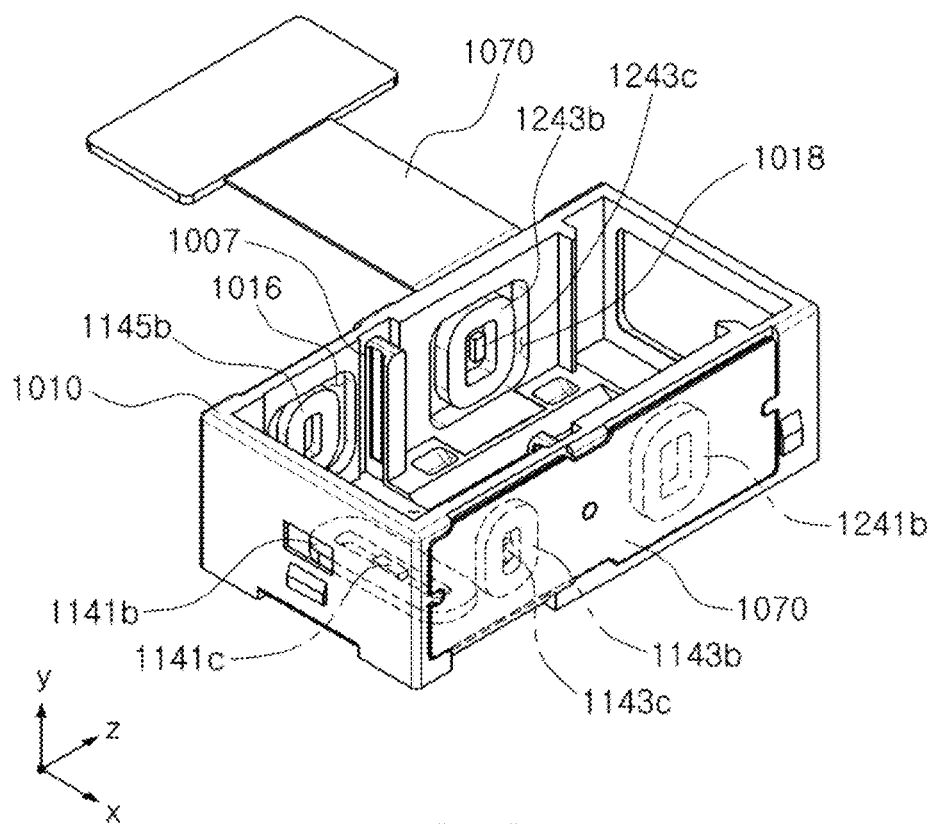
FIG. 9 is an assembled perspective view illustrating the housing and a board in the camera module of FIG. 2.

In this example, unlike other examples described below with respect to FIGS. 13-24, since the first ball bearings 1131 aligned along the first axis (the X axis) and the second ball bearings 1133 aligned along the second axis (the Y axis) are provided, the two first ball bearings 1131 aligned along the first axis (the X axis) may be provided in a cylindrical shape extending in the first axis direction (the X axis direction), and the two second ball bearings 1133 aligned along the second axis (the Y axis) may be provided in a cylindrical shape extending in the second axis direction (the Y axis direction). In this case, the seating grooves 1132, 1134, 1021, and 1121 may be provided in a semi-cylindrical shape corresponding to shapes of the first and second ball bearings (see FIG. 6B). Meanwhile, a case in which the two first ball bearings 1131 and the two second ball bearings 1133 are provided is illustrated in FIG. 6B, but one or two or more first ball bearings 1131 and second ball bearings 1133 elongated in the first axis direction (the X-axis direction) or the second axis direction (the Y-axis direction) may also be provided.

In the example illustrated in FIGS. 2-10, the first ball bearings 1131 and the second ball bearings 1133 are provided on a front surface and a rear surface of the rotation plate 1130, respectively. In another example, the first ball bearings 1131 and the second ball bearings 1133 are provided on a rear surface and a front surface of the rotation plate 1130, respectively. That is, the first ball bearings 1131 may be aligned along the second axis (the Y axis) and the second ball bearings 1133 may be aligned along the first axis (the X axis). However, the structure illustrated in the drawings will hereinafter be described for convenience of explanation. The rotation plate 1130 is provided between the rotation holder 1120 and an inner surface of the housing 1010. In addition, the rotation holder 1120 is supported by the housing 1010 through the rotation plate 1130, the first ball bearings 1131, and the second ball bearings 1133 by the attractive force between the pulling magnet 1151 or the pulling yoke provided on the rotation holder 1120 and the pulling yoke 1153 or the pulling magnet provided on the housing 1010.

The seating grooves 1132 and 1134 into which the first ball bearings 1131 and the second ball bearings 1133 are inserted, respectively, are provided in the front surface and the rear surface of the rotation plate 1130, respectively, and include first seating grooves 1132 into which the first ball bearings 1131 are partially inserted and second seating grooves 1134 into which the second ball bearings 1133 are partially inserted.

In addition, the housing 1010 is provided with third seating grooves 1021 into which the first ball bearings 1131 are partially inserted, and the rotation holder 1120 is provided with fourth seating grooves 1121 into which the second ball bearings 1133 are partially inserted.

The first seating grooves 1132, the second seating grooves 1134, the third seating grooves 1021, and the fourth seating grooves 1121 described above may be provided in a hemispherical or polygonal (poly-prismatic or poly-pyramidal) groove shape so that the first ball bearings 1131 and the second ball bearings 1133 can easily rotate (depths of the seating grooves 1132, 1134, 1021, and 1121 may be smaller than radii thereof to enable the first ball bearings 1131 and the second ball bearings 1133 to be easily rotated. The first ball bearings 1131 and the second ball bearings 1133 are not entirely disposed inside the seating grooves, but are partially exposed to enable the rotation plate 1130 and the rotation holder 1120 to be easily rotated. In addition, positions and the numbers of first seating grooves 1132, second seating grooves 1134, third seating grooves 1021, and fourth seating grooves 1121 correspond to positions and numbers of the first ball bearings 1131 aligned along the first axis (the X axis) and the second ball bearings 1133 aligned along the second axis (the Y axis).

The first ball bearings 1131 and the second ball bearings 1133 serve as bearings while rolling in the first seating grooves 1132, the second seating grooves 1134, the third seating grooves 1021, and the fourth seating grooves 1121.

In another example, the first ball bearings 1131 and the second ball bearings 1133 have a structure in which they are fixedly provided in at least one of the housing 1010, the rotation plate 1130, and the rotation holder 1120. For example, the first ball bearings 1131 are fixedly provided in the housing 1010 or the rotation plate 1130, and the second ball bearings 1133 are fixedly provided in the rotation plate 1130 or the rotation holder 1120. In this case, only a member facing a member in which the first ball bearings 1131 or the second ball bearings 1133 are fixedly provided is provided with the seating grooves. In this case, the ball bearings serve as friction bearings by sliding in the seating grooves rather rotating in the seating grooves.

When the first ball bearings 1131 and the second ball bearings 1133 are fixedly provided in any one of the housing 1010, the rotation plate 1130, and the rotation holder 1120, the first ball bearings 1131 and the second ball bearings 1133 may be provided in a spherical shape or a hemispherical shape. However, a case in which the first ball bearings 1131 and the second ball bearings 1133 are provided in a hemispherical shape is only an example, and the first ball bearings 1131 and the second ball bearings 1133 may also be provided to have a protruding length greater or smaller than that of a hemisphere. As described above, a case in which the ball bearings 1131 and 1133 are provided in cylindrical shapes extending along the first axis (the X axis) and the second axis (the Y axis), respectively, may also be similarly applied.

In addition, the first ball bearings 1131 and the second ball bearings 1133 may be separately manufactured and be then attached to any one of the housing 1010, the rotation plate 1130, and the rotation holder 1120. Alternatively, the first ball bearings 1131 and the second ball bearings 1133 may be provided integrally with the housing 1010, the rotation plate 1130, or the rotation holder 1120 at the time of manufacturing the housing 1010, the rotation plate 1130, or the rotation holder 1120.

The first driving part 1140 generates a driving force so that the rotation holder 1120 is rotatable around the two axes.

As an example, the first driving part 1140 includes magnets 1141a, 1143a, and 1145a and the coils 1141b, 1143b, and 1145b disposed to face the magnets 1141a, 1143a, and 1145a, respectively.

When power is applied to the coils 1141b, 1143b, and 1145b, the rotation holder 1120 on which the magnets 1141a, 1143a, and 1145a are mounted is rotated around the first axis (the X axis) and the second axis (the Y axis) by electromagnetic interaction between the magnets 1141a, 1143a, and 1145a and the coils 1141b, 1143b, and 1145b.

The magnets 1141a, 1143a, and 1145a are mounted on the rotation holder 1120. In the example illustrated in FIGS. 2-10, the magnet 1141a of the magnets 1141a, 1143a, and 1145a is mounted on a lower surface of the rotation holder 1120, and the magnets 1143a and 1145a of the magnets 1141a, 1143a, and 1145a are mounted on side surfaces of the rotation holder 1120.

The coils 1141b, 1143b, and 1145b are mounted on the housing 1010. In the example illustrated in FIGS. 2-10, the coils 1141b, 1143b, and 1145b are mounted on the housing 1010 through the main board 1070. That is, the coils 1141b, 1143b, and 1145b are mounted on the main board 1070, and the main board 1070 is mounted on the housing 1010. An example in which the main board 1070 is entirely integrally provided so that both the coils for the reflecting module 1100 and the coils for the lens module 1200 are mounted thereon is illustrated in the drawings, but the main board 1070 may be provided as two or more separate boards on which the coils for the reflecting module 1100 and the coils for the lens module 1200 are mounted, respectively.

A reinforcing plate (not illustrated) may be mounted below the main board 1070 to reinforce the main board.

In this example, when the rotation holder 1120 is rotated, a closed loop control manner of sensing and feeding back a position of the rotation holder 1120 is used.

Therefore, position sensors 1141c and 1143c are provided to enable a closed loop control to be performed. The position sensors 1141c and 1143c may be Hall sensors.

In the example illustrated in FIGS. 2-10, the position sensors 1141c and 1143c are disposed inside the coils 1141b and 1143b, respectively, and are mounted on the main board 1070 on which the coils 1141b and 1143b are mounted. In another example, the position sensors 1141c and 1143c are disposed outside the coils 1141b and 1143b, respectively.

The main board 1070 is provided with a gyro sensor (not illustrated) sensing shaking of the camera module 1001 by a hand-shake or other movement of the user, and is provided with a driver integrated circuit (IC) (not illustrated) providing driving signals to the coils 1141b, 1143b, and 1145b based on signals from the gyro sensor.

Figure 10:
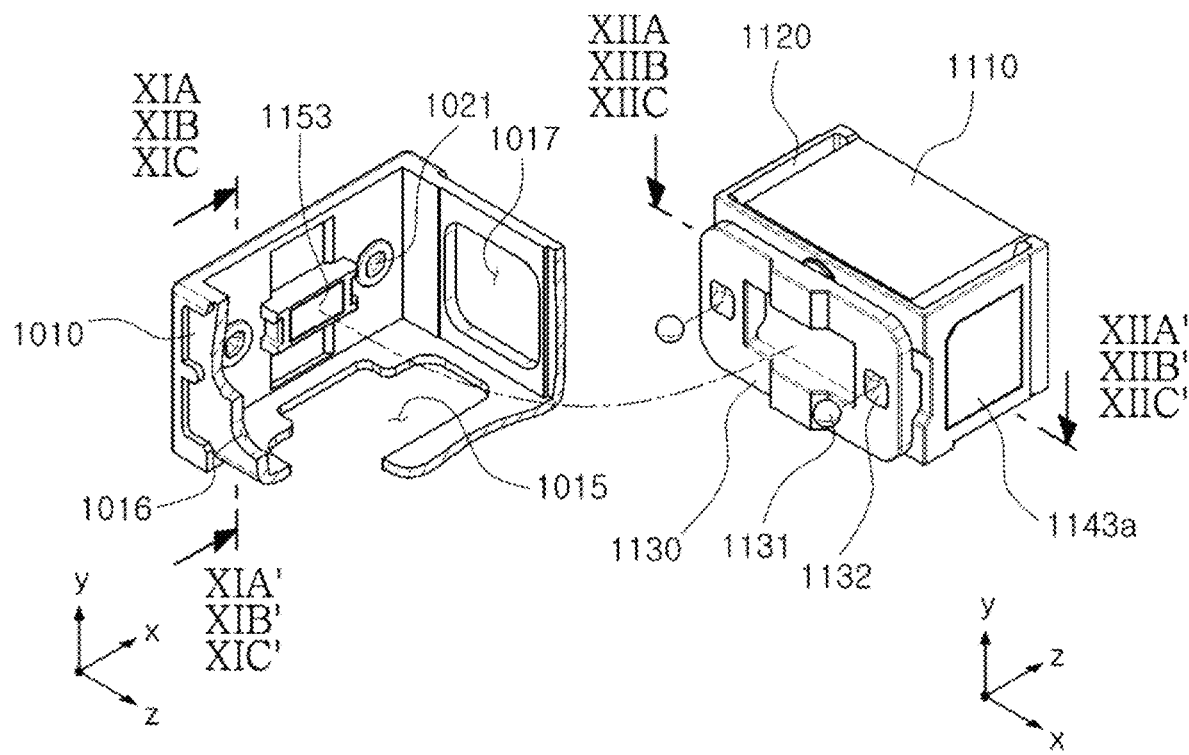
FIG. 10 is an exploded perspective view illustrating the housing and the rotation holder in the camera module of FIG. 2.
Figure 11A:
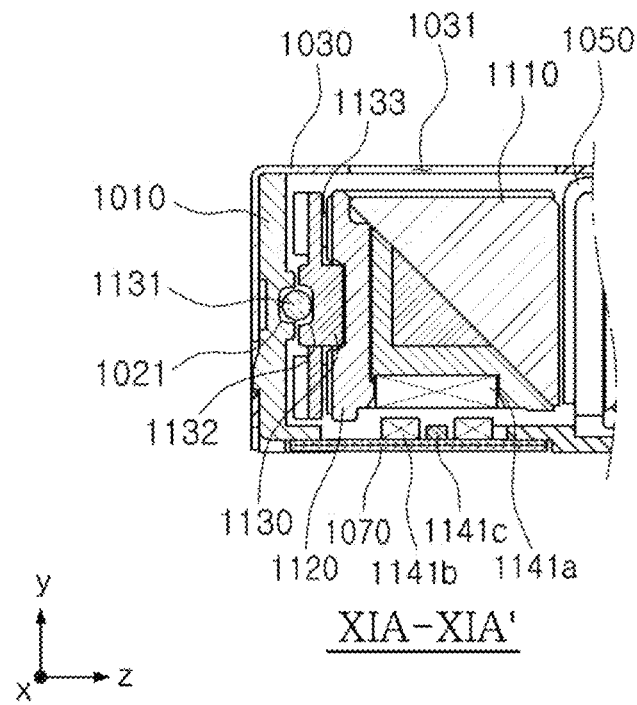
FIGS. 11A through 11C are cross-sectional views taken along the lines XIA-XIA' through XIC-XIC' in FIG. 10 illustrating how the rotation holder of the camera module of FIG. 2 is rotated around a first axis.
Figure 11B:
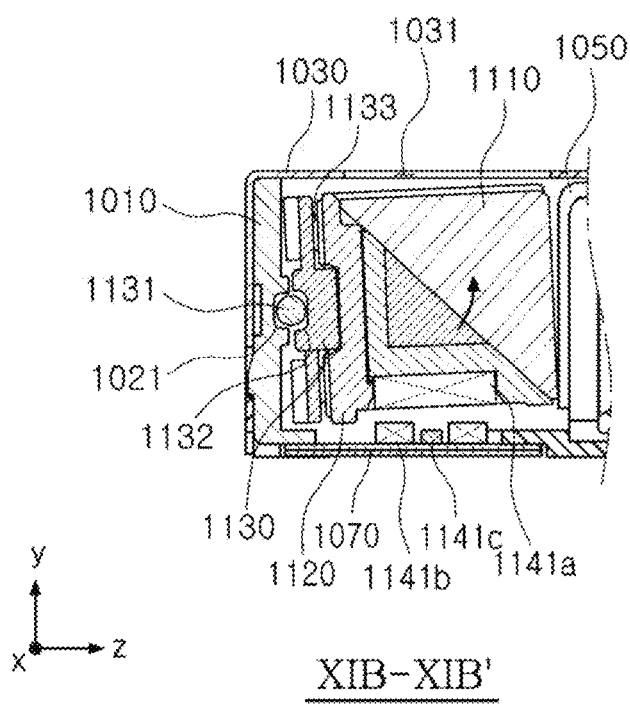
Figure 11C:
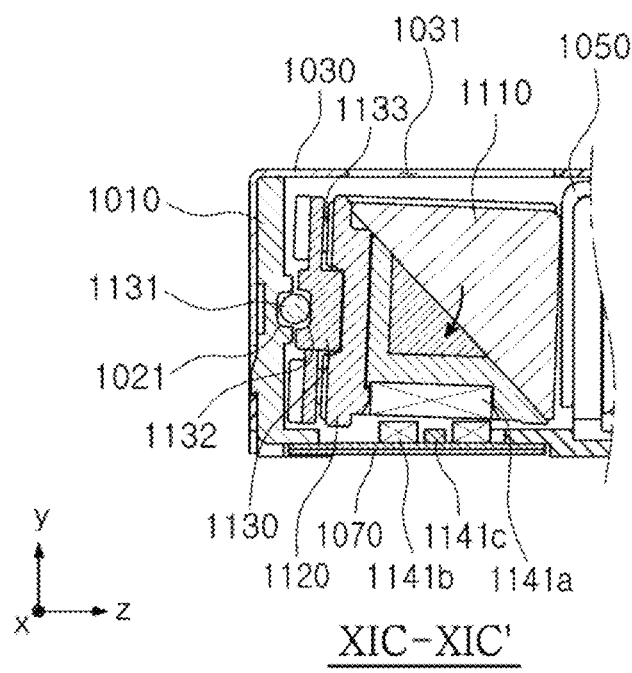
Figure 12A:
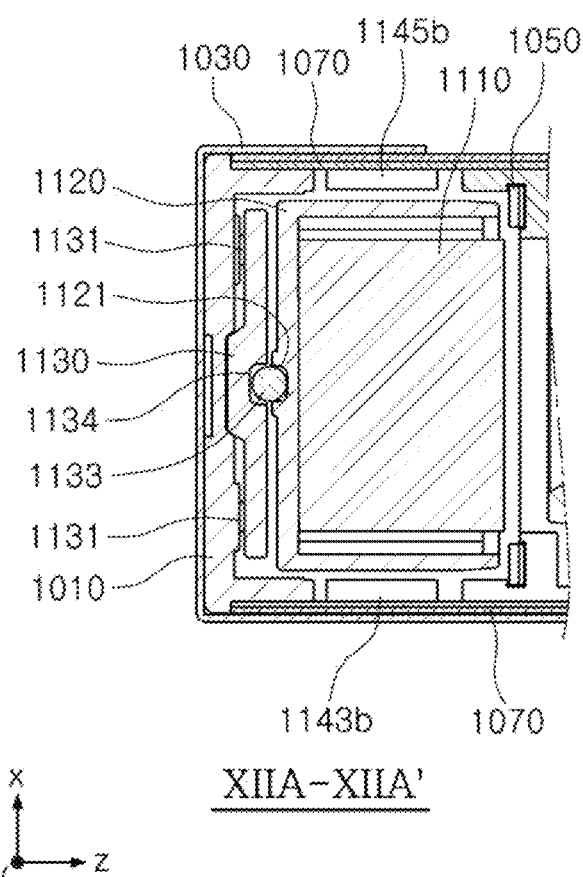
FIGS. 12A through 12C are cross-sectional views taken along the lines XIIA-XIIA' through XIIC-XIIC' in FIG. 10 illustrating how the rotation holder of the camera module of FIG. 2 is rotated around a second axis.
Figure 12B:
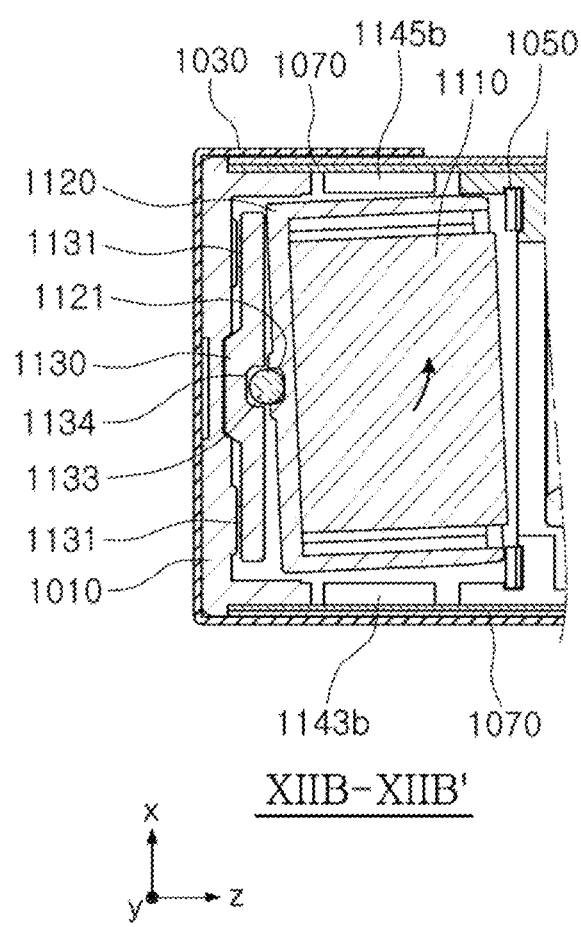
Figure 12C:
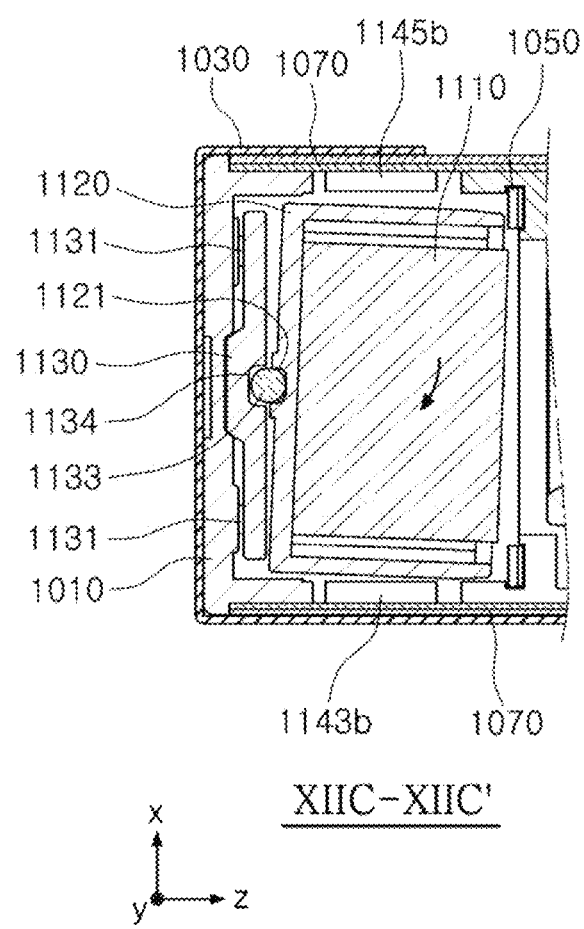

FIGS. 11A through 11C are cross-sectional views taken along the lines XIA-XIA' through XIC-XIC' in FIG. 10 illustrating how the rotation holder of the camera module of FIG. 2 is rotated around a first axis, and FIGS. 12A through 12C are cross-sectional views taken along the lines XIIA-XIIA' through XIIC-XIIC' in FIG. 10 illustrating how the rotation holder of the camera module of FIG. 2 is rotated around a second axis.

Referring to FIGS. 11A through 11C, when the rotation holder 1120 is rotated around the first axis (the X axis), the rotation holder 1120 is rotated by rotation of the rotation plate 1130 around the first ball bearings 1131 arranged along the first axis (the X axis). In this case, the rotation holder 1120 is not moved relative to the rotation plate 1130. In addition, referring to FIGS. 12A through 12C, when the rotation holder 1120 is rotated around the second axis (the Y axis), the rotation holder 1120 is rotated around the second ball bearings 1133 arranged along the second axis (the Y axis). In this case, the rotation plate 1130 is not rotated, and the rotation holder 1120 is thus moved relative to the rotation plate 1130.

That is, when the rotation holder 1120 is rotated around the first axis (the X axis), the first ball bearings 1131 operate, and when the rotation holder 1120 is rotated around the second axis (the Y axis), the second ball bearings 1133 operate. The reason for this is that the second ball bearings 1133 aligned along the second axis (the Y axis) do not move in a state in which they are fitted into the seating grooves when the rotation holder 1120 is rotated around the first axis (the X axis), and the first ball bearings 1131 aligned along the first axis (the X axis) do not move in a state in which they are fitted into the seating grooves when the rotation holder 1120 is rotated around the second axis (the Y axis), as illustrated in the drawings.

The light of which the path is changed by the reflecting module 1100 is incident to the lens module 1200. Therefore, optical axes of the stacked lenses provided in the lens module 1200 are aligned in the Z-axis direction, a direction in which the light is emitted from the reflecting module 1100. In addition, the lens module 1200 includes the second driving part 1240 in order to implement the AF function and the zoom function. The lens module 1200 has a relatively low weight since it does not include components for the OIS function, and is moved in the optical axis direction in order to implement the AF function and the zoom function. Therefore, power consumption is significantly reduced.

The lens module 1200 includes a lens holder 1220 provided in the internal space of the housing 1010 and having lenses stacked therein and magnets 1241a and 1243a of the second driving part 1240 moving the lens holder 1220 disposed thereon.

Lenses capturing an image of a subject are stacked in the lens holder 1220, and are mounted along an optical axis in the lens holder 1220.

The light of which the path is changed by the reflecting module 1100 is refracted while passing through the lenses. The optical axis (the Z axis) of each of the lenses is perpendicular to the thickness direction (the Y-axis direction) of the lens module 1200.

The lens holder 1220 is movable in the optical axis direction (the Z-axis direction) for the purpose of AF. In the example illustrated in the drawings, the lens holder 1220 is configured to be movable in a direction (including an opposite direction to the direction) in which the light of which the path is changed by the reflecting module 1100 passes through the lenses.

The second driving part 1240 generates a driving force to move the lens holder 1220 in the optical axis direction (the Z-axis direction). That is, the second driving part 1240 moves the lens holder 1220 to change a distance between the lens holder 1220 and the reflecting module 1100.

In the example illustrated in FIGS. 2-10, the second driving part 1240 includes magnets the 1241a and 1243a and the coils 1241b and 1243b disposed to face the magnets 1241a and 1243a, respectively.

When power is applied to the coils 1241b and 1243b, the lens holder 1220 on which the magnets 1241a and 1243a are mounted is moved in the optical axis direction (the Z-axis direction) by an electromagnetic interaction between the magnets 1241*a* and 1243*a* and the coils 1241*b* and 1243*b*.

The magnets 1241*a* and 1243*a* are mounted on the lens holder 1220. In example illustrated in FIGS. 2-10, the magnets 1241*a* and 1243*a* are mounted on side surfaces of the lens holder 1220.

The coils 1241*b* and 1243*b* are mounted on the housing 1010. In the example illustrated in FIGS. 2-10, the main board 1070 is mounted on the housing 1010 in a state in which the coils 1241*b* and 1243*b* are mounted on the main board 1070. A case in which both the coils for the reflecting module 1100 and the coils for the lens module 1200 are mounted on the main board 1070 is illustrated in the drawings for convenience of explanation, but the main board 1070 is not limited thereto, but may be also provided as separate boards on which the coils for the reflecting module 1100 and the coils for the lens module 1200 are mounted, respectively.

In this example, when the lens holder 1220 is moved, a closed loop control manner of sensing and feeding back a position of the lens holder 1220 is used. Therefore, a position sensor 1243*c* is provided to enable a closed loop control to be performed. The position sensor 1243*c* may be a Hall sensor.

In the example illustrated in FIGS. 2-10, the position sensor 1243*c* is disposed inside the coil 1243*b*, and is mounted on the main board 1070 on which the coil 1243*b* is mounted. In another example, the position sensor 1243*c* is disposed outside the coil 1243*b*.

The lens holder 1220 is mounted in the housing 1010 to be movable in the optical axis direction (the Z-axis direction). In the example illustrated in the drawings, ball members 1250 are disposed between the lens holder 1220 and the housing 1010.

The ball members 1250 serve as bearings guiding the movement of the lens holder 1220 in an AF process. In addition, the ball members 1250 also serve to maintain a spacing between the lens holder 1220 and the housing 1010.

The ball members 1250 roll in the optical axis direction (the Z-axis direction) when a driving force in the optical axis direction (the Z-axis direction) is generated. Therefore, the ball members 1250 guide the movement of the lens holder 1220 in the optical axis direction (the Z-axis direction).

Guide grooves 1221 and 1231 accommodating the ball members 1250 are formed in at least one of surfaces of the lens holder 1220 facing the housing 1010.

The ball members 1250 are accommodated in the guide grooves 1221 and 1231 and are fitted between the lens holder 1220 and the housing 1010.

The guide grooves 1221 and 1231 may have a length in the optical axis direction (the Z-axis direction).

The ball members 1250 prevented from moving in the first axis direction (the X-axis direction) and the second axis direction (the Y-axis direction), and can move only in the optical axis direction (the Z-axis direction), in a state in which they are accommodated in the guide grooves 1221 and 1231. In the example illustrated FIGS. 2-10, the ball members 1250 can roll only in the optical axis direction (the Z-axis direction).

To this end, each of the guide grooves 1221 and 1231 is elongated in the optical axis direction (the Z-axis direction). In addition, cross sections of the guide grooves 1221 and 1231 may have various shapes such as a round shape or a polygonal shape.

The lens holder 1220 is pressed toward the housing 1010 so that the ball members 1250 are maintained in a state in which they are in contact with the lens holder 1220 and the housing 1010.

To this end, the housing 1010 is provided with yokes 1260 facing the magnets 1241*a* and 1243*a* mounted on the lens holder 1220. The yokes 1260 are formed of a magnetic material.

An attractive force is generated between the yokes 1260 and the magnets 1241*a* and 1243*a*. Therefore, the lens holder 1220 can be moved in the optical axis direction (the Z-axis direction) by the driving force of the second driving part 1240 in a state in which the lens holder 1220 is in contact with the ball members 1250.

Figure 13:
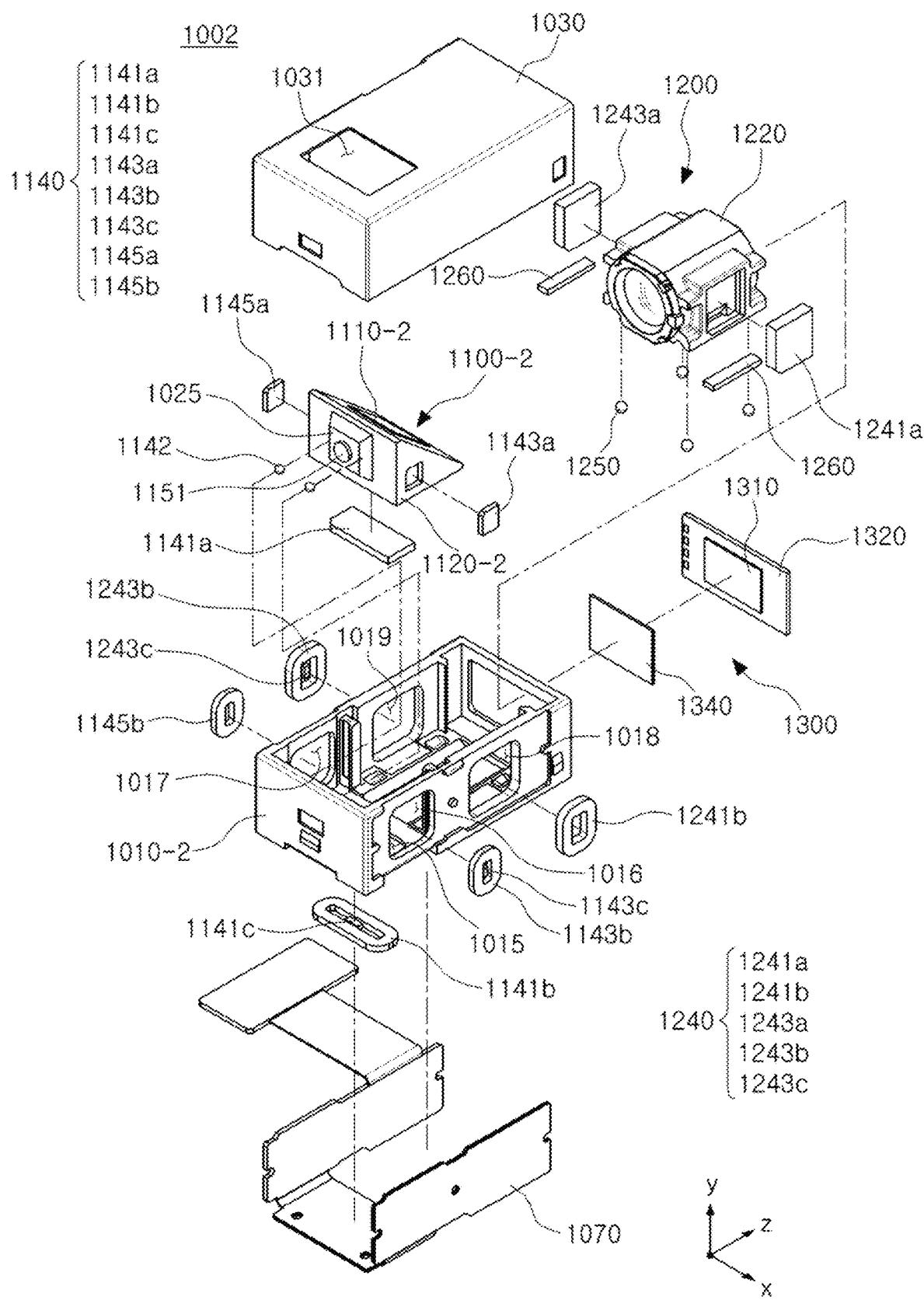
FIG. 13 is an exploded perspective view illustrating another example of a camera module.
Figure 14:
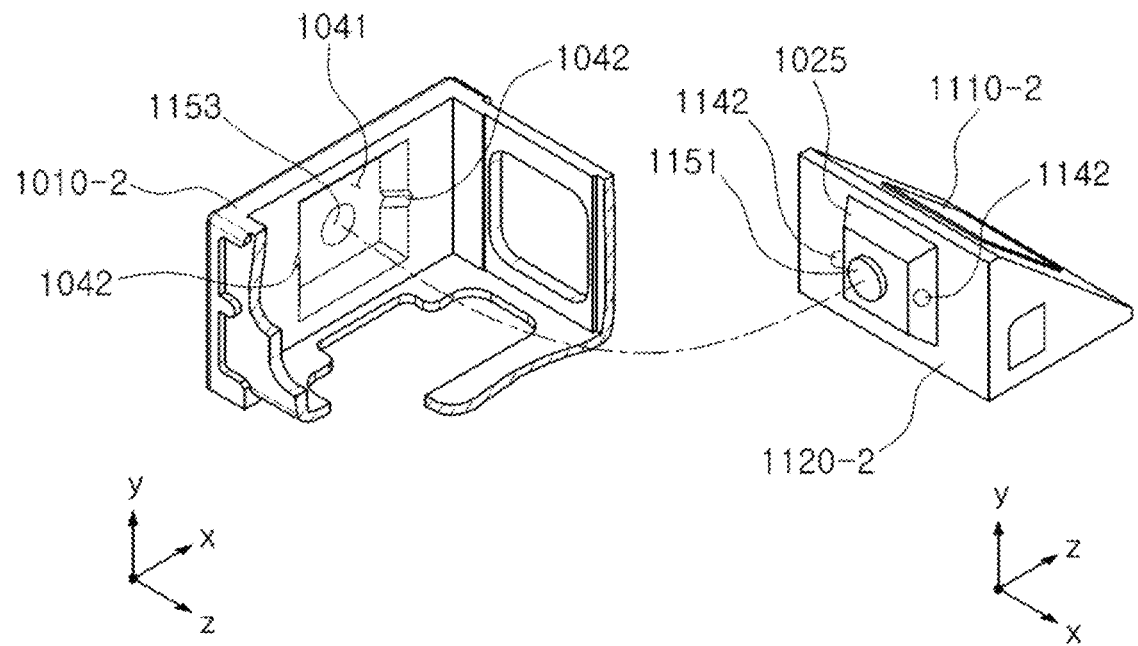
FIG. 14 is an exploded perspective view illustrating a coupled relationship between a housing and a rotation holder of the camera module of FIG. 13.

FIG. 13 is an exploded perspective view illustrating another example of a camera module, and FIG. 14 is an exploded perspective view illustrating a coupled relationship between a housing and a rotation holder of the camera module of FIG. 13.

Referring to FIGS. 13 and 14, all the components of a camera module 1002 except for a reflecting module are the same as those of the camera module 1001 of FIGS. 2 through 10. Hereinafter, a configuration of the reflecting module will be described in detail below, and the same components will be denoted by the same reference numerals, and a detailed description thereof will be omitted.

The camera module 1002 includes a reflecting module 1100-2, the lens module 1200, and the image sensor module 1300 provided in a housing 1010-2.

In the reflecting module 1100-2, a rotation holder 1120-2 is supported by an inner surface of the housing 1010-2 through third ball bearings 1142 without using a separate additional component unlike the camera module 1001 of FIGS. 2 through 10. That is, the reflecting module 1100-2 does not have a component corresponding to the rotation plate 1130 of the camera module 1001 of FIGS. 2 through 10.

To this end, the housing 1010-2 has a rotation recess 1041 formed in a portion thereof facing the rotation holder 1120-2, and the rotation holder 1120-2 has a rotation protrusion 1025 inserted into the rotation recess 1041. The rotation recess 1041 and the rotation protrusion 1025 have a polygonal shape such as a triangular shape or a rectangular shape when viewed in the Z-axis direction to enable the rotation holder 1120-2 to perform rotation having only two degrees of freedom around predetermined axes (for example, the X axis and the Y axis). When the rotation recess 1041 and the rotation protrusion 1025 have the polygonal shape, after the rotation protrusion 1025 is inserted into the rotation recess 1041, the rotation holder 1120-2 cannot be rotated around the Z-axis because corner portions of the rotation protrusion 1025 and the rotation recess 1041 catch on each other. The rotation recess 1041 and the rotation protrusion 1025 should not have a circular shape when viewed in the Z-axis direction because a circular shape would enable the rotation holder to be rotated around the Z-axis.

In addition, edges of the rotation recess 1041 and the rotation protrusion 1025 are provided as inclined surfaces or round surfaces so that the rotation holder 1120-2 is easily rotated around the predetermined axes (for example, the X axis and the Y axis).

In addition, opposite edges of the rotation recess 1041 are provided with third ball bearings 1142 aligned along the first axis (the X axis). In addition, the opposite edges of the rotation recess 1041 are provided with seating grooves 1042 into which the third ball bearings 1142 are inserted. The seating grooves 1042 are provided in a linear or curved shape elongated in the optical axis direction (the Z-axis direction) along the edges of the rotation recess 1041. In addition, a cross section of the seating grooves 1042 may have various shapes such as a round shape or a polygonal shape.

In addition, the third ball bearings 1142 are provided in a state in which they are freely movable relative to, or fixed to, the housing 1010-2 or the rotation holder 1120-2. When the third ball bearings 1142 are provided in the state in which they are fixed to the housing 1010-2 or the rotation holder 1120-2, the third ball bearings 1142 may have a spherical shape, a hemispherical shape, or a spherical cap shape (a shape obtained by cutting a sphere by a plane to obtain a shape smaller or larger than a hemisphere. In addition, when the third ball bearings 1142 are provided in the state in which they are fixed to the housing 1010-2 or the rotation holder 1120-2, the third ball bearings 1142 may be manufactured integrally with the housing 1010-2 or the rotation holder 1120-2, or may be manufactured separately from the housing 1010-2 or the rotation holder 1120-2 and then attached to the housing 1010-2 or the rotation holder 1120-2.

Since the reflecting module 1100-2 in this example includes the third ball bearings 1142 aligned along the first axis (the X axis), the rotation holder 1120-2 may be rotated around the first axis (the X axis) or the second axis (the Y axis) perpendicular to the first axis (the X axis in a state in which the rotation holder 1120-2 is supported by the housing 1010-2 through the third ball bearings 1142 by an attractive force between the pulling magnet 1151 and the pulling yoke 1153.

In this case, since the reflecting module 1100-2 includes only the third ball bearings 1142 aligned along the first axis (the X axis), when the rotation holder 1120-2 is rotated around the first axis (the X axis), a rotation axis of the rotation holder 1120-2 substantially corresponds to the first axis (the X axis) connecting the third ball bearings 1142 to each other, but when the rotation holder 1120-2 is rotated around the second axis (the Y axis), a rotation axis of the rotation holder 1120-2 substantially parallel with the second axis (the Y axis) is formed at a virtual point moved from the third ball bearings 1142 toward the rotation holder 1120-2 by a predetermined distance. However, a position of the rotation axis may be variously modified depending on a design shape. This will be described in more detail with reference to FIGS. 15A through 16C.

The reflecting module 1100-2 includes the reflecting member 1110-2, the rotation holder 1120-2 on which the reflecting member 1110-2 is mounted, and a first driving part 1140 generating a driving force to move the rotation holder 1120-2.

The reflecting member 1110-2 changes a path of light. For example, the reflecting member 1110-2 may be a mirror or a prism reflecting the light. The reflecting member 1110-2 is fixed to the rotation holder 1120-2.

The first driving part 1140 generates the driving force so that the rotation holder 1120-2 is rotatable around two directions. For example, the first driving part 1140 includes magnets 1141a, 1143a, and 1145a and coils 1141b, 1143b, and 1145b disposed to face the magnets 1141a, 1143a, and 1145a, and includes position sensors 1141c and 1143c sensing a position of the rotation holder 1120-2. Driving and positions of the magnets 1141a, 1143a, and 1145a, the coils 1141b, 1143b, and 1145b, and the position sensors 1141c and 1143c are the same as those described above in the camera module of FIGS. 2 through 10, and a detailed description thereof will thus be omitted.

Figure 15A:
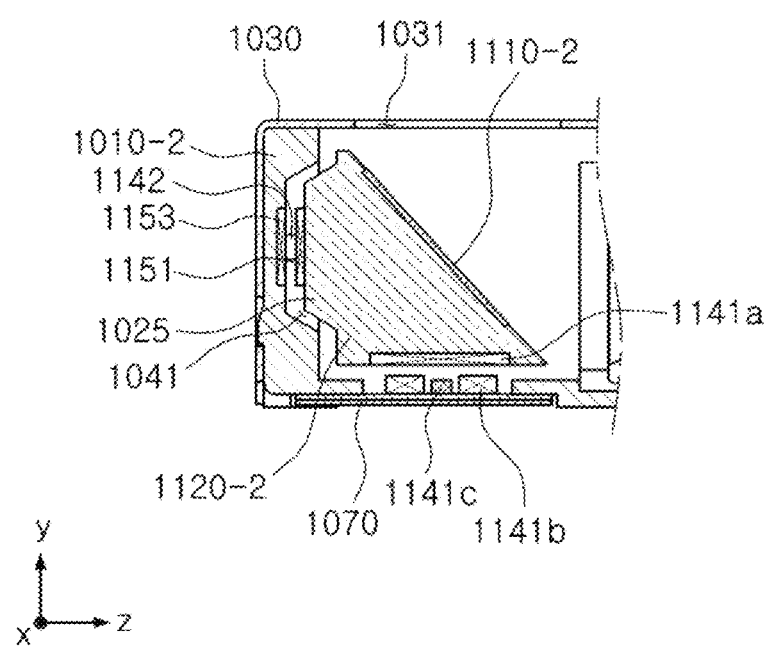
FIGS. 15A through 15C are cross-sectional views illustrating how the rotation holder of the camera module of FIG. 13 is rotated around a first axis.
Figure 15B:
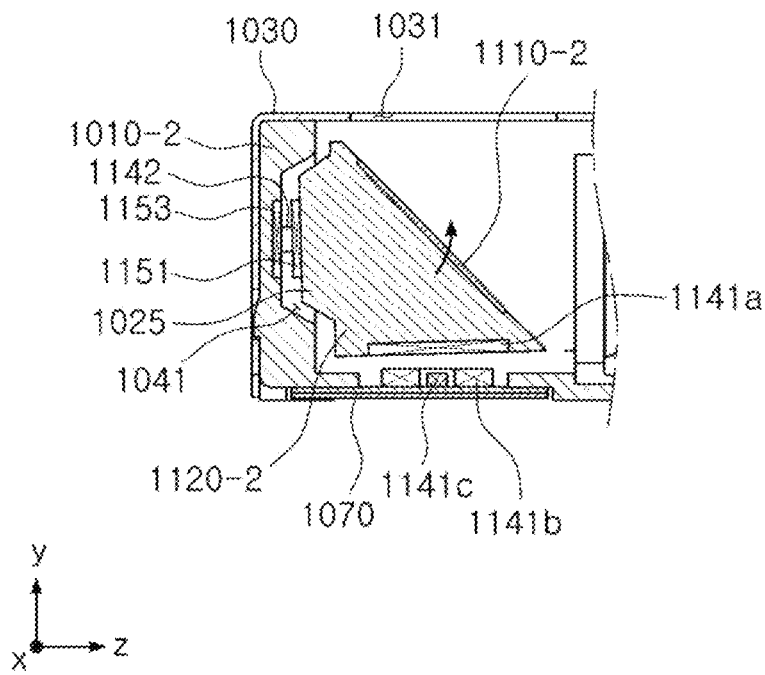
Figure 15C:
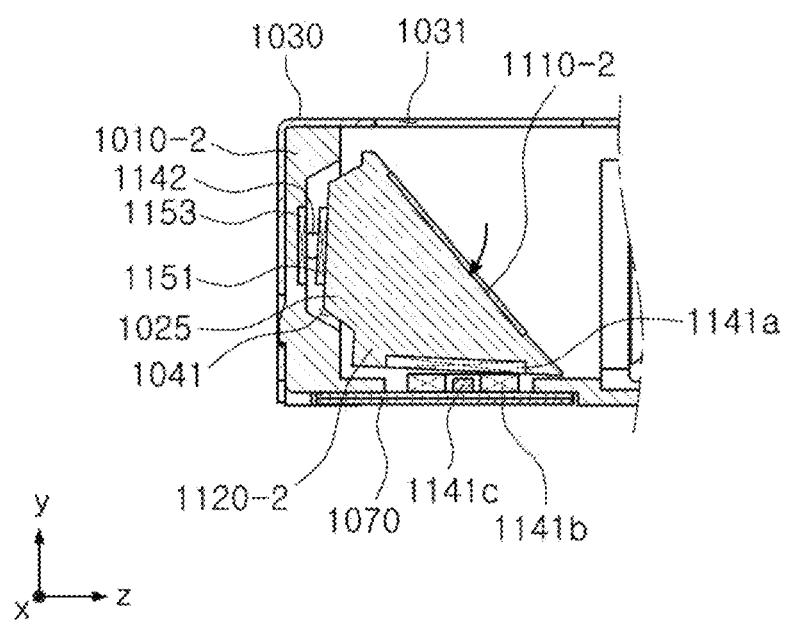
Figure 16A:
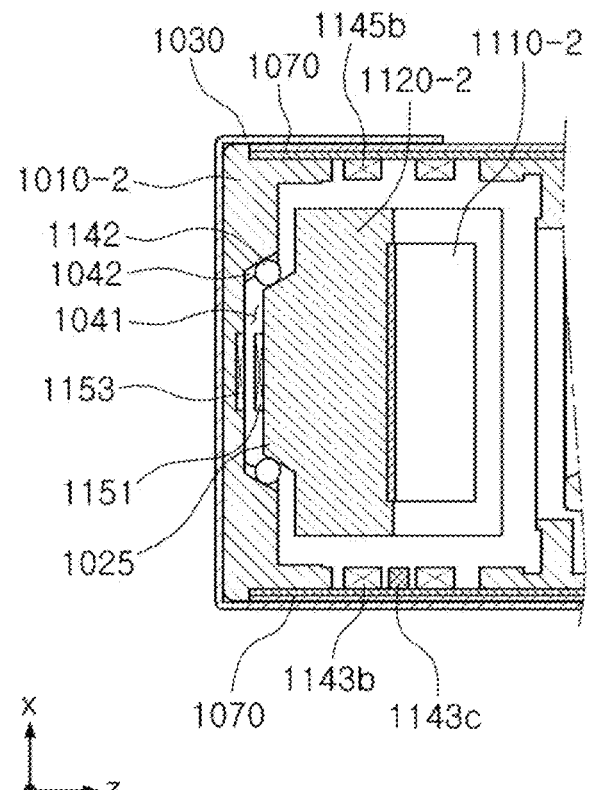
FIGS. 16A through 16C are cross-sectional views illustrating how the rotation holder of the camera module of FIG. 13 is rotated around a second axis.
Figure 16B:
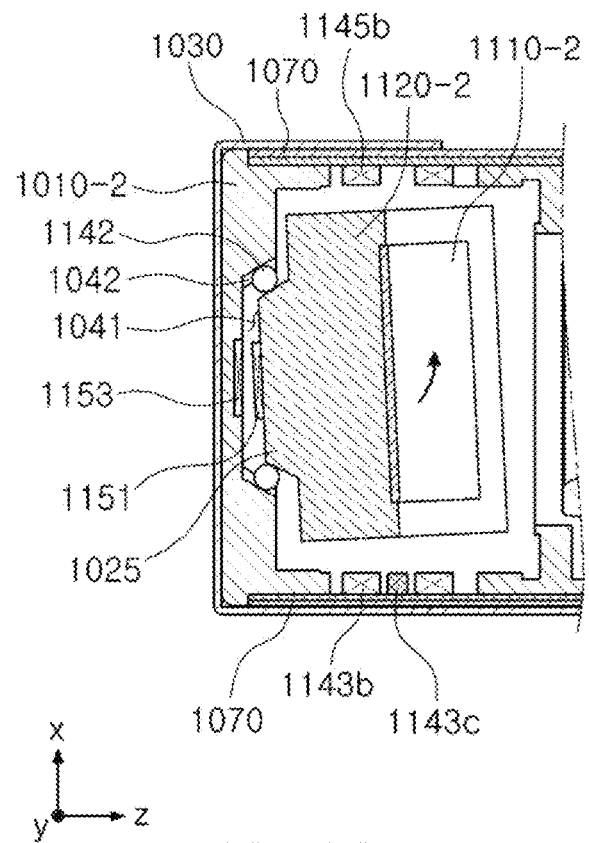
Figure 16C:
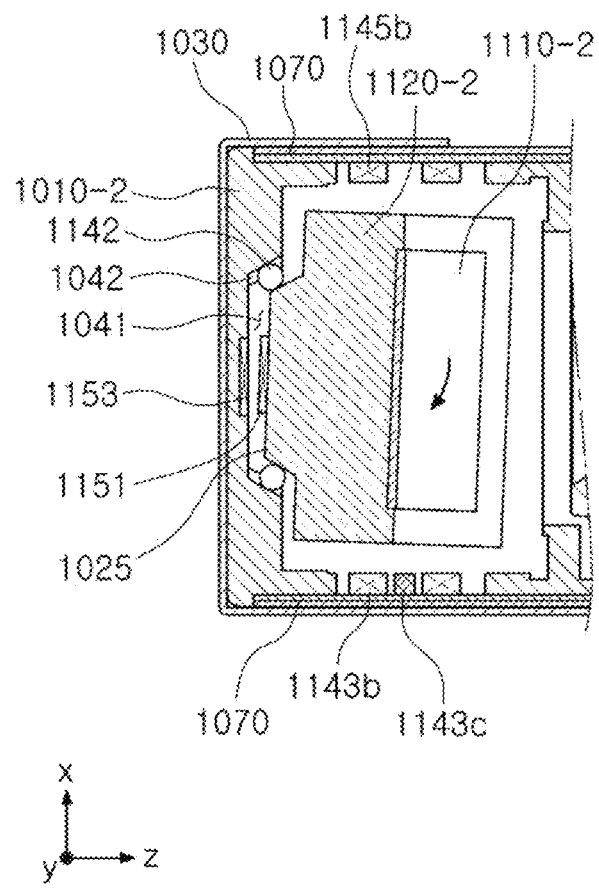

FIGS. 15A through 15C are cross-sectional views illustrating how the rotation holder of the camera module of FIG. 13 is rotated around a first axis, and FIGS. 16A through 16C are cross-sectional views illustrating how the rotation holder of the camera module of FIG. 13 is rotated around a second axis.

Referring to FIGS. 15A through 15C, when the rotation holder 1120-2 is rotated around the first axis (the X axis), the rotation holder 1120-2 is rotated around the first axis (the X axis) along which the third ball bearings 1142 are arranged. In this case, since the reflecting module 1100-2 includes only the third ball bearings 1142 aligned along the first axis (the X axis), when the rotation holder 1120-2 is rotated around the first axis (the X axis), the rotation axis of the rotation holder 1120-2 is substantially an extended line connecting the third ball bearings 1142 to each other, and is substantially parallel with the first axis (the X axis).

Referring to FIGS. 16A through 16C, when the rotation holder 1120-2 is rotated around the second axis (the Y axis), a rotation axis of the rotation holder 1120-2 substantially parallel with the second axis (the Y axis) is formed at a virtual point moved from the third ball bearings 1142 toward the rotation holder 1120-2 by a predetermined distance. In this case, the rotation axis is provided in a portion spaced apart from a contact portion between the third ball bearings 1142 and the rotation holder 1120-2, and a sliding movement amount of the rotation holder 1120-2 is greater compared to a case in which the rotation holder 1120-2 is moved relative to the first axis (the X axis).

Figure 17:
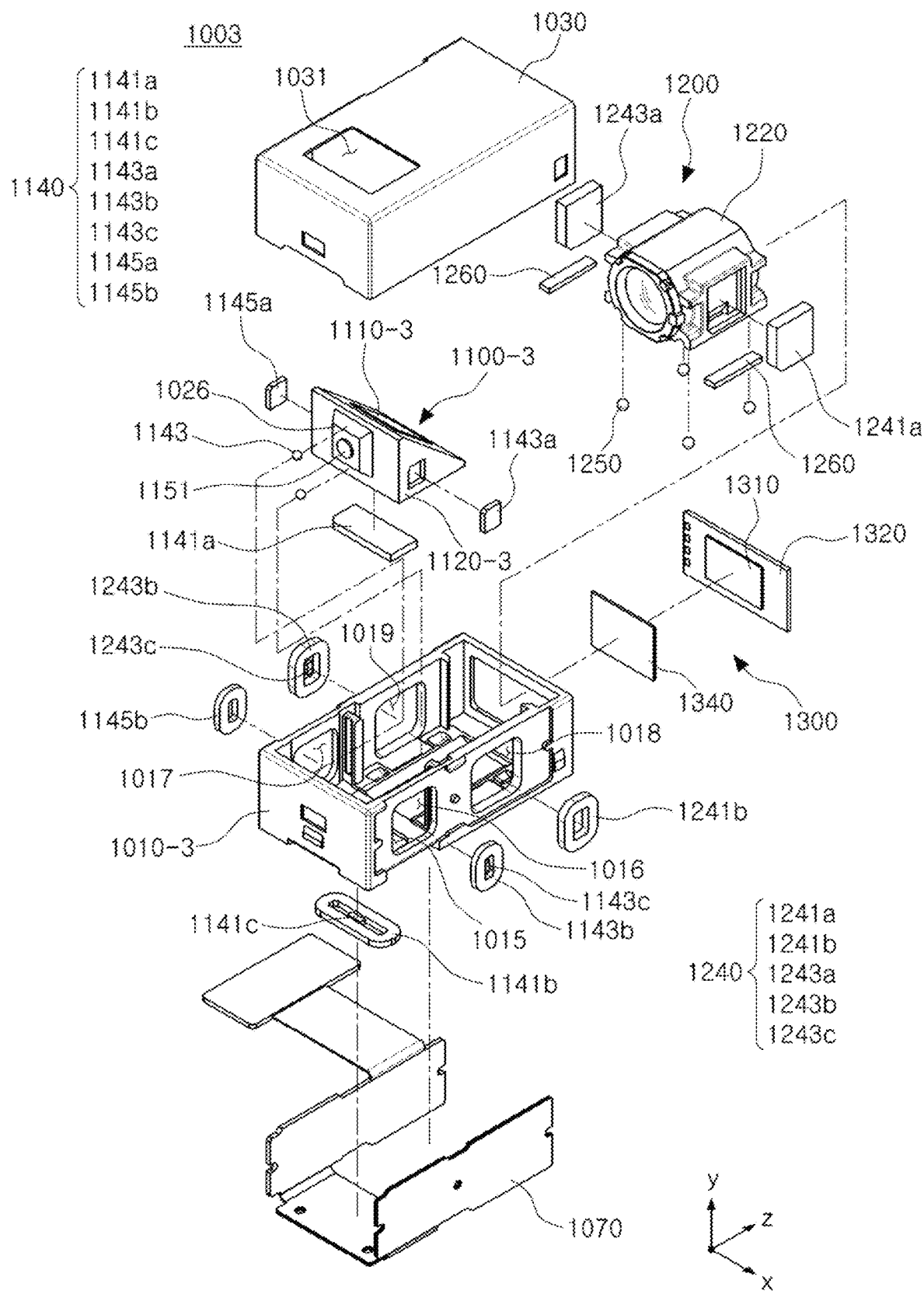
FIG. 17 is an exploded perspective view illustrating another example of a camera module.
Figure 18:
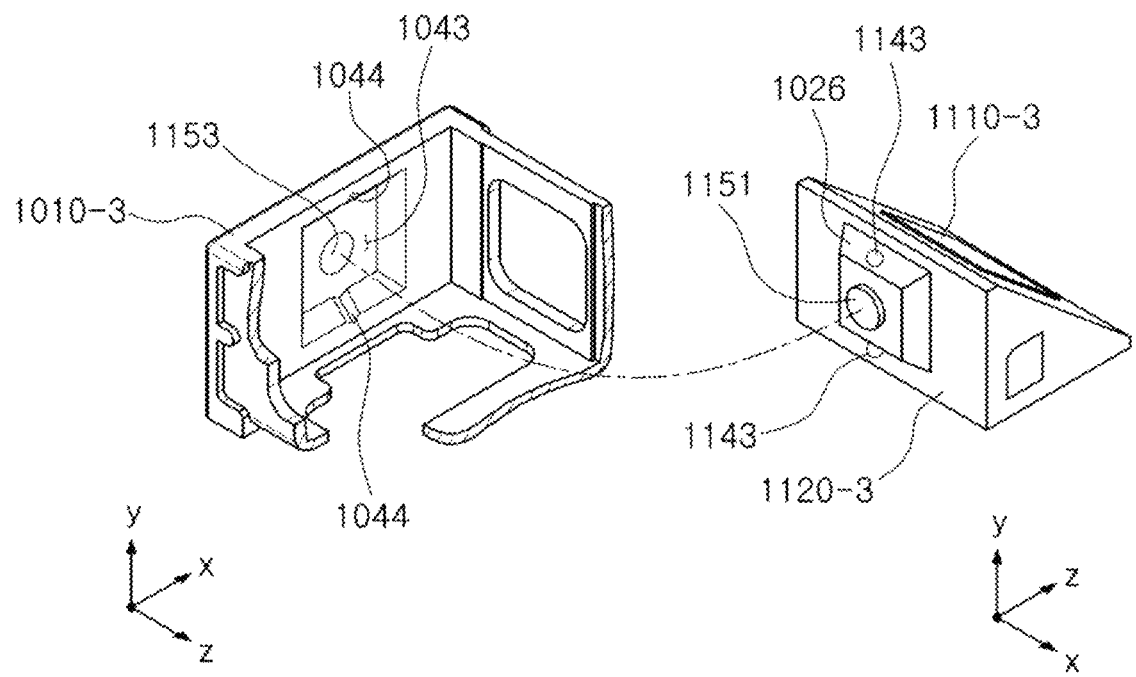
FIG. 18 is an exploded perspective view illustrating a coupled relationship between a housing and a rotation holder of the camera module of FIG. 17.

FIG. 17 is an exploded perspective view illustrating another example of a camera module, and FIG. 18 is an exploded perspective view illustrating a coupled relationship between a housing and a rotation holder of the camera module of FIG. 17.

Referring to FIGS. 17 and 18, all the components of a camera module 1003 except for a reflecting module are the same as those of the camera module 1001 of FIGS. 2 through 10. Hereinafter, a configuration of the reflecting module will be described in detail below, and the same components will be denoted by the same reference numerals, and a detailed description thereof will be omitted.

The camera module 1003 includes a reflecting module 1100-3, the lens module 1200, and the image sensor module 1300 provided in a housing 1010-3.

In the reflecting module 1100-3, a rotation holder 1120-3 is supported by an inner surface of the housing 1010-3 through fourth ball bearings 1143 without using a separate additional component unlike the camera module 1001 of FIGS. 2 through 10. That is, the reflecting module 1100-3 does not have a component corresponding to the rotation plate 1130 of the camera module 1001 of FIGS. 2 through 10).

To this end, the housing 1010-3 has a rotation recess 1043 formed in a portion thereof facing the rotation holder 1120-3, and the rotation holder 1120-3 is provided with a rotation protrusion 1026 inserted into the rotation recess 1043. The rotation recess 1043 and the rotation protrusion 1026 have a polygonal shape such as a triangular shape or a rectangular shape when viewed in the Z-axis direction in order for the rotation holder 1120-3 to perform only rotation having two degrees of freedom around predetermined axes (for example, the X axis and the Y axis). The reason is that when the rotation recess 1043 and the rotation protrusion 1026 have the polygonal shape, after the rotation protrusion 1026 is inserted into the rotation recess 1043, the rotation holder 1120-3 cannot be rotated around the Z axis because corner portions of the rotation protrusion 1026 and the rotation groove 1043 catch on each other.

In addition, edges of the rotation recess 1043 and the rotation protrusion 1026 may be provided as inclined surfaces or round surfaces so that the rotation holder 1120-3 is easily rotated around the predetermined axes (for example, the X axis and the Y axis).

In addition, the edges of the rotation recess 1043 may be provided with fourth ball bearings 1143 aligned along the second axis (the Y axis) (opposite edges of the rotation recess 1043 may be provided with two fourth ball bearings aligned in the Y-axis direction). In addition, the edges of the rotation recess 1043 may be provided with seating grooves 1044 into which the fourth ball bearings 1143 are inserted. The seating grooves 1044 may be provided in a linear or curved shape to be elongate in the second axis direction (the Y-axis direction) along the edges of the rotation recess 1043. In addition, a cross section of the seating groove 1044 may have various shapes such as a round shape or a polygonal shape.

In addition, the fourth ball bearings 1143 may be provided in a state in which they are freely movable relative to, or fixed to, the housing 1010-3 or the rotation holder 1120-3. When the fourth ball bearings 1143 are provided in the state in which they are fixed to the housing 1010-3 or the rotation holder 1120-3, the fourth ball bearings 1143 may be provided in a spherical or hemispherical shape (smaller or greater than a hemisphere). In addition, when the fourth ball bearings 1143 are provided in the state in which they are fixed to the housing 1010-3 or the rotation holder 1120-3, the fourth ball bearings 1143 may be entirely manufactured integrally with the housing 1010-3 or the rotation holder 1120-3 or may be manufactured separately from the housing 1010-3 or the rotation holder 1120-3 and be then attached to the housing 1010-3 or the rotation holder 1120-3.

Since the reflecting module 1100-3 of this example includes the fourth ball bearings 1143 aligned along the second axis (the Y axis), the rotation holder 1120-3 may be rotated around the second axis (the Y axis) or be rotated around the first axis (the X axis) perpendicular to the second axis (the Y axis), in a state in which it is supported by the housing 1010-3 through the fourth ball bearings 1143 by attractive force between the pulling magnet 1151 and the pulling yoke 1153.

In this case, since the reflecting module 1100-3 includes only the fourth ball bearings 1143 aligned along the second axis (the Y axis), when the rotation holder 1120-3 is rotated around the second axis (the Y axis), a rotation axis of the rotation holder 1120-3 substantially corresponds to the second axis (the Y axis) connecting the fourth ball bearings 1143 to each other, but when the rotation holder 1120-3 is rotated around the first axis (the X axis), a rotation axis of the rotation holder 1120-3 substantially parallel with the first axis (the X axis) is formed at a virtual point moved from the fourth ball bearings 1143 toward the rotation holder 1120-3 by a predetermined distance. This will be described in more detail with reference to FIGS. 19A through 20C.

The reflecting module 1100-3 includes the reflecting member 1110-3, the rotation holder 1120-3 on which the reflecting member 1110-3 is mounted, and a first driving part 1140 generating driving force to move the rotation holder 1120-3.

The reflecting member 1110-3 may change a path of light. As an example, the reflecting member 1110-3 may be a mirror or a prism reflecting the light. The reflecting member 1110-3 may be fixed to the rotation holder 1120-3.

The first driving part 1140 may generate the driving force so that the rotation holder 1120-3 is rotatable in two directions. For example, the first driving part 1140 may include a magnets 1141a, 1143a, and 1145a and a coils 1141b, 1143b, and 1145b disposed to face the magnets 1141a, 1143a, and 1145a, and may include position sensors 1141c and 1143c sensing a position of the rotation holder 1120-3. Driving and positions of the magnets 1141a, 1143a, and 1145a, the coils 1141b, 1143b, and 1145b, and the position sensors 1141c and 1143c are the same as those described above in the camera module of FIGS. 2 through 10, and a detailed description thereof will thus be omitted.

Figure 19A:
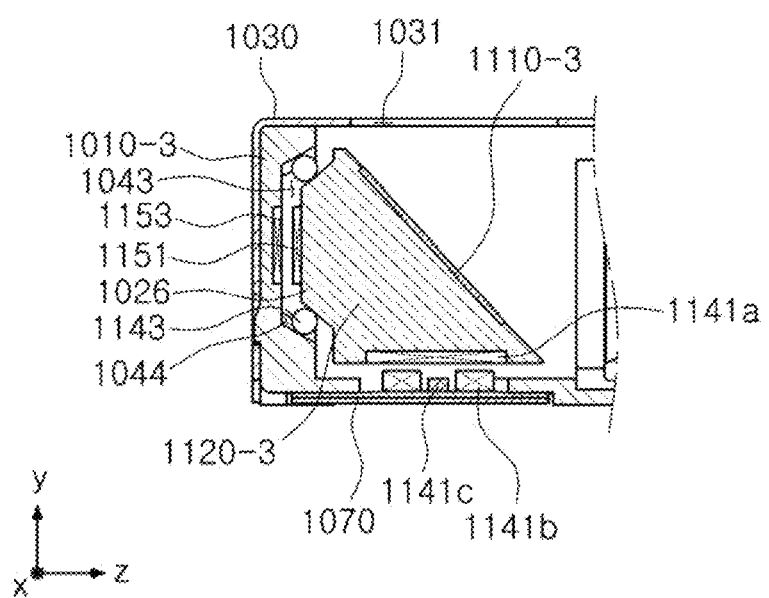
FIGS. 19A through 19C are cross-sectional views illustrating how the rotation holder of the camera module of FIG. 18 is rotated around a first axis.
Figure 19B:
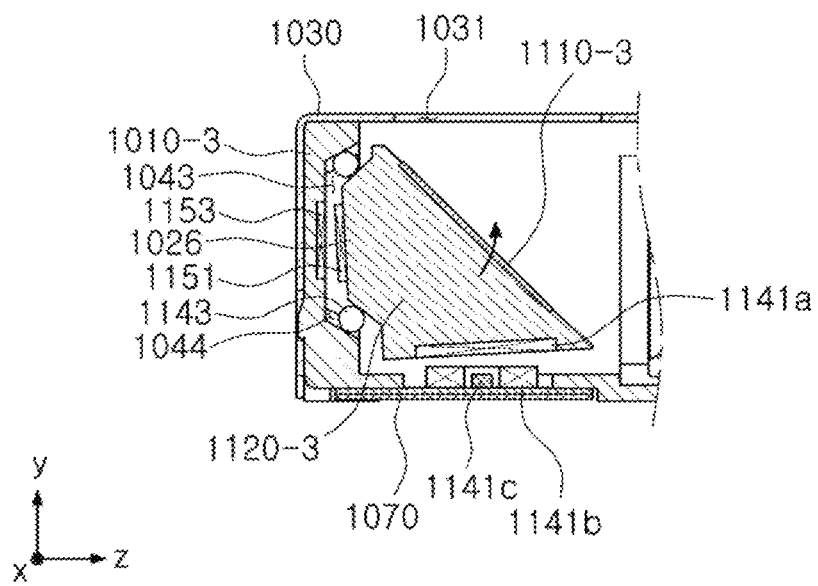
Figure 19C:
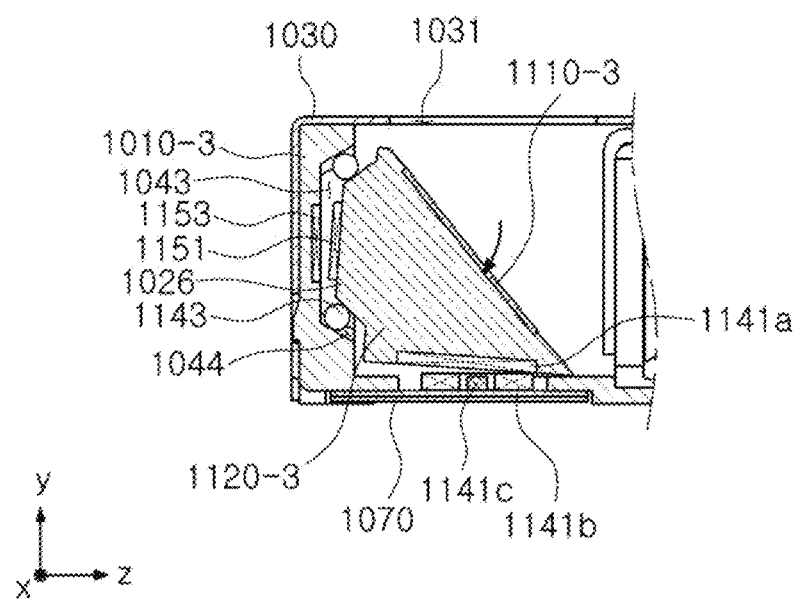
Figure 20A:
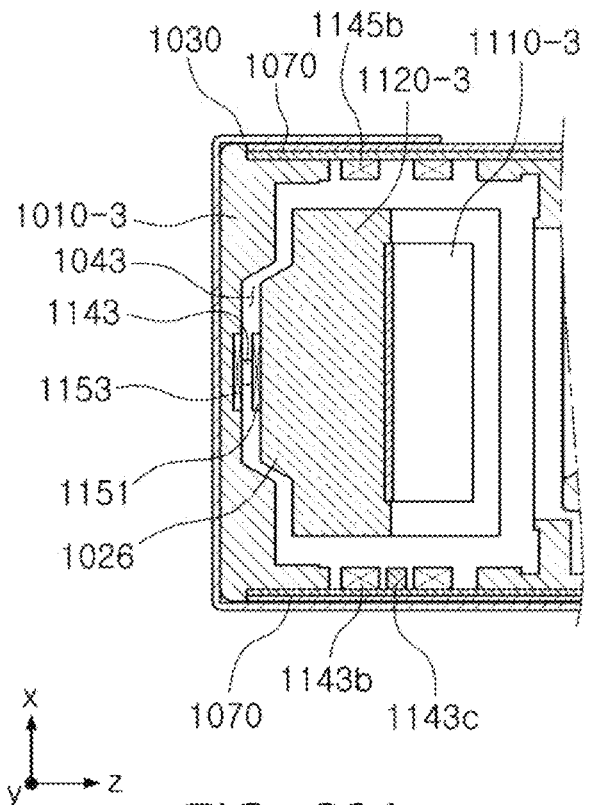
FIGS. 20A through 20C are cross-sectional views illustrating how the rotation holder of the camera module of FIG. 18 is rotated around a second axis.
Figure 20B:
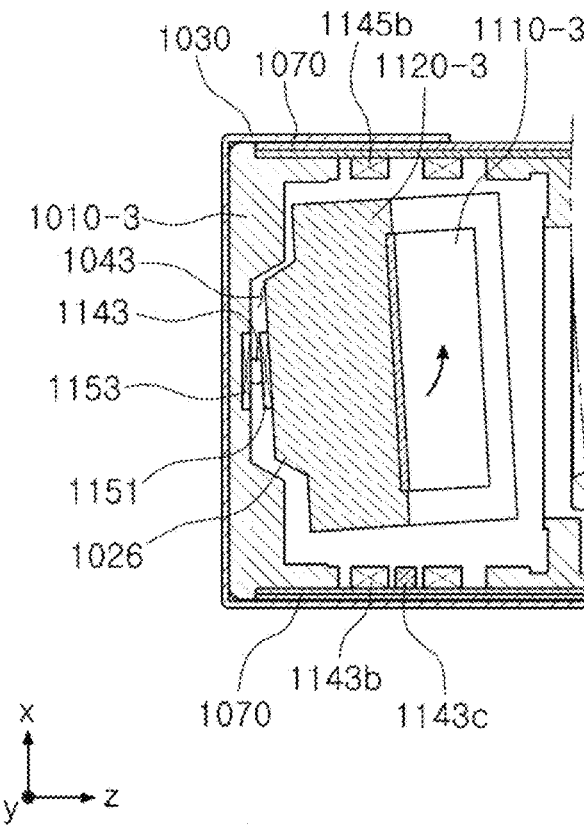
Figure 20C:
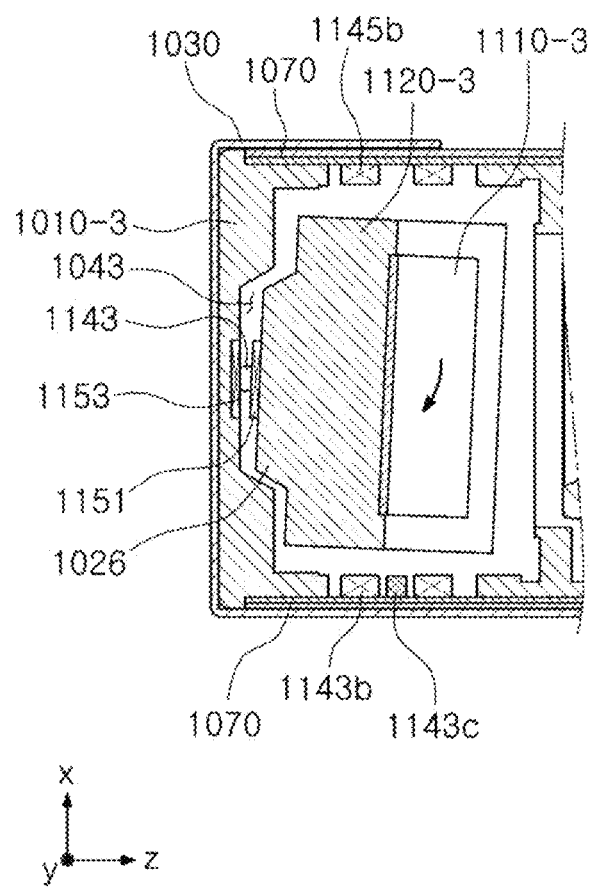

FIGS. 19A through 19C are cross-sectional views illustrating how the rotation holder of the camera module of FIG. 17 is rotated around a first axis, and FIGS. 20A through 20C are cross-sectional views illustrating how the rotation holder of the camera module of FIG. 17 is rotated around a second axis.

Referring to FIGS. 19A through 19C, when the rotation holder 1120-3 is rotated around the first axis (the X axis), the rotation axis of the rotation holder 1120-3 substantially parallel with the first axis (the X axis) is formed at the virtual point moved from the fourth ball bearings 1143 toward the rotation holder 1120-3 by the predetermined distance. In this case, the rotation axis is provided in a portion spaced apart from a contact portion between the fourth ball bearings 1143 and the rotation holder 1120-3, and a sliding movement amount of the rotation holder 1120-3 is greater compared to a case in which the rotation holder 1120-3 is moved relative to the second axis (the Y axis).

Referring to FIGS. 20A through 20C, when the rotation holder 1120-3 is rotated around the second axis (the Y axis), the rotation holder 1120-3 may be rotated around the second axis (the Y axis) along which the fourth ball bearings 1143 are arranged. In this case, since the reflecting module 1100-3 includes only the fourth ball bearings 1143 aligned along the second axis (the Y axis), when the rotation holder 1120-3 is rotated around the second axis (the Y axis), the rotation axis of the rotation holder 1120-3 is substantially an extended line connecting the fourth ball bearings 1143 to each other, which is substantially parallel with the second axis (the Y axis).

Figure 21:
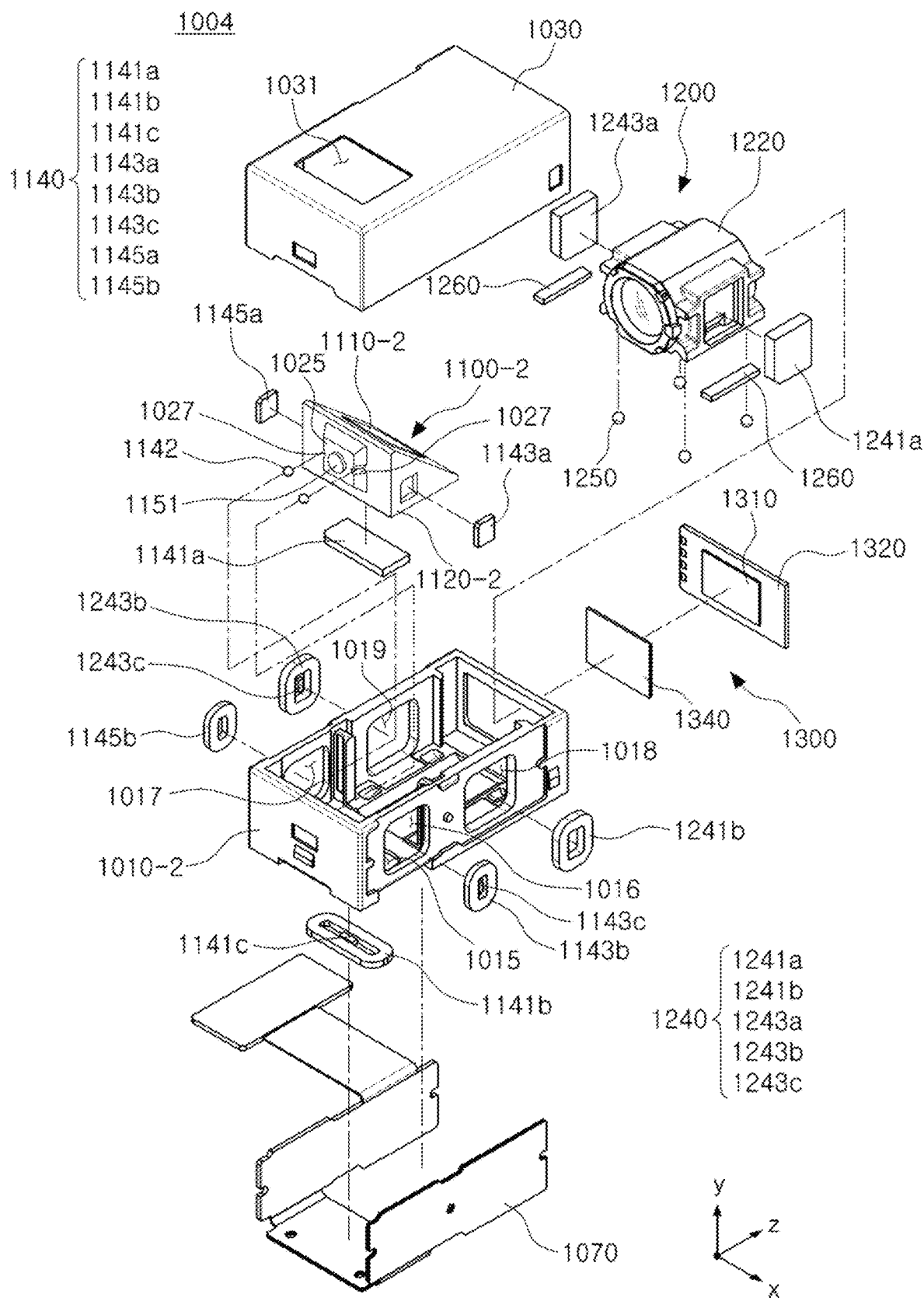
FIG. 21 is an exploded perspective view illustrating another example of a camera module.
Figure 22:
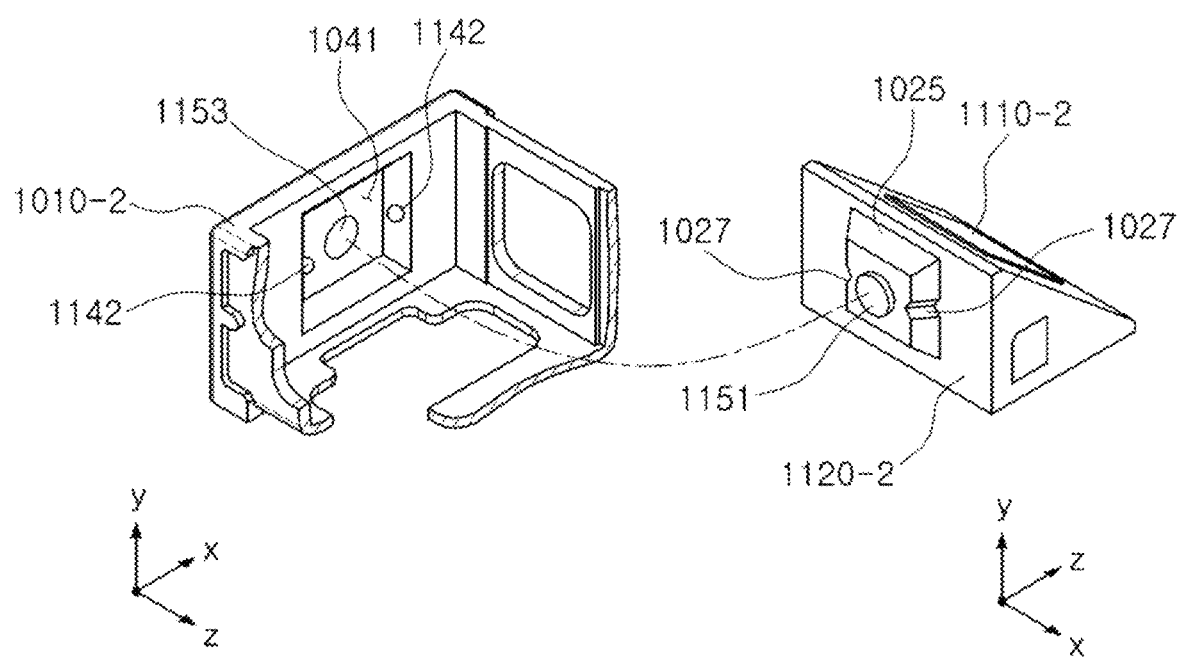
FIG. 22 is an exploded perspective view illustrating a coupled relationship between a housing and a rotation holder of the camera module of FIG. 21.

FIG. 21 is an exploded perspective view illustrating another example of a camera module, and FIG. 22 is an exploded perspective view illustrating a coupled relationship between a housing and a rotation holder of the camera module of FIG. 21.

Referring to FIGS. 21 and 22, all the components of a camera module 1004 are the same as those of the camera module 1002 of FIGS. 13 and 14 except that seating grooves 1027 in which third ball bearings 1142 are seated are provided in a rotation holder 1120-2. Hereinafter, only a configuration of the seating grooves 1027 will be briefly described below, and the same components will be denoted by the same reference numerals, and a detailed description thereof will be omitted.

The camera module 1004 includes a reflecting module 1100-2, the lens module 1200, and the image sensor module 1300 provided in a housing 1010-2.

In the reflecting module 1100-2 in this example, the seating grooves 1027 in which the third ball bearings 1142 are seated are provided in the rotation holder 1120-2, unlike in the reflecting module 1100-2 of the camera module 1002 of FIGS. 13 and 14 in which the seating grooves 1042 in which the third ball bearings 1142 are seated are provided in the edges of the rotation recess 1041. The seating grooves 1027 are provided in a linear or curved shape to be elongate in the first axis direction (the X-axis direction) in the edges of the rotation protrusion 1025. In addition, a cross section of the seating groove 1027 may have various shapes such as a round shape, a polygonal shape, and the like. All the components other than the seating grooves 1027 are the same as those of the camera module 1002 of FIGS. 13 and 14. and a detailed description thereof will thus be omitted.

In addition, since only the positions at which the third ball bearings 1142 are provided are slightly different from the positions at which the third ball bearings 1142 are provided in the camera module 1002 of FIGS. 13 and 14 due to a structure in which the seating grooves 1027 are provided in the rotation holder 1120-2, and a mechanism by which the rotation holder 1120-2 is rotated around the first axis (the X axis) or the second axis (the Y axis) is the same as that of the camera module 1002 of FIGS. 13 and 14, such a mechanism is illustrated in FIGS. 15A through 15C and FIGS. 16A through 16C relating to the camera module 1002 of FIGS. 13 and 14.

Figure 23:
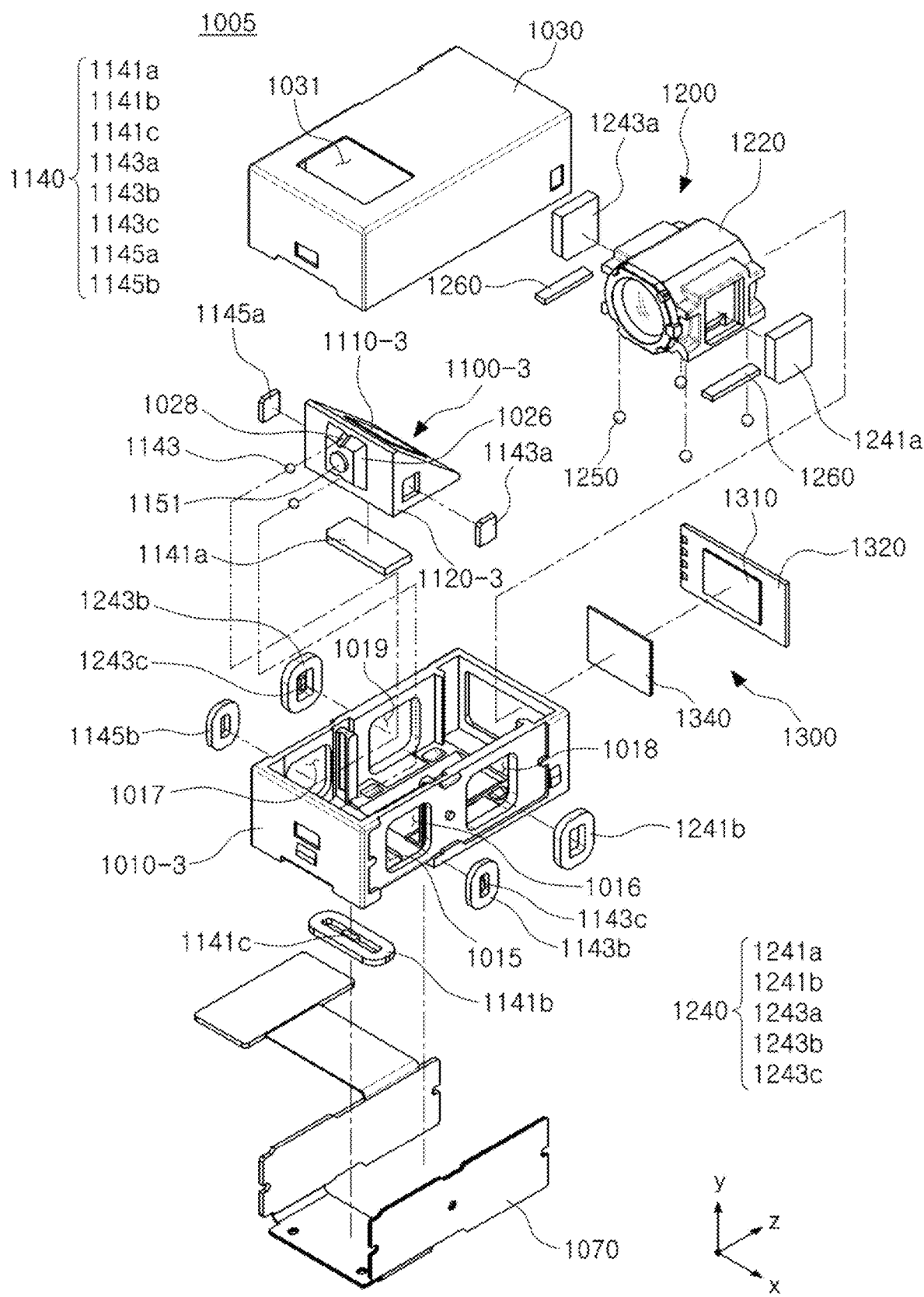
FIG. 23 is an exploded perspective view illustrating another example of a camera module.
Figure 24:
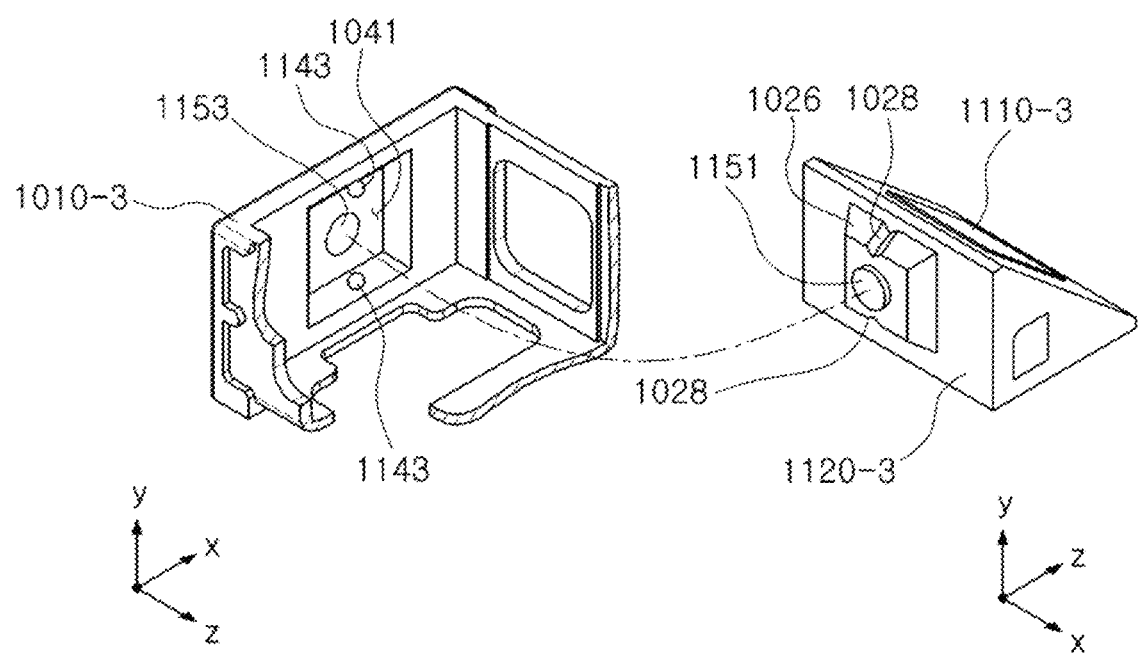
FIG. 24 is an exploded perspective view illustrating a coupled relationship between a housing and a rotation holder of the camera module of FIG. 23.

FIG. 23 is an exploded perspective view illustrating another example of a camera module, and FIG. 24 is an exploded perspective view illustrating a coupled relationship between a housing and a rotation holder of the camera module of FIG. 23.

Referring to FIGS. 23 and 24, all the components of a camera module 1005 are the same as those of the camera module 1003 of FIGS. 17 and 18 except that seating grooves 1028 in which fourth ball bearings 1143 are seated are provided in a rotation holder 1120-3. Hereinafter, only a configuration of the seating grooves 1028 will be briefly described below, and the same components will be denoted by the same reference numerals, and a detailed description thereof will be omitted.

The camera module 1005 includes a reflecting module 1100-3, the lens module 1200, and the image sensor module 1300 provided in a housing 1010-3.

In the reflecting module 1100-3 in this example, the seating grooves 1028 in which the fourth ball bearings 1143 are seated are provided in the rotation holder 1120-3, unlike in the reflecting module 1100-3 of the camera module 1003 of FIGS. 17 and 18 in which the seating grooves 1044 in which the third ball bearings 1142 are seated are provided in the edges of the rotation recess 1043. In this example, the seating grooves 1028 are provided in a linear or curved shape to be elongate in the second axis direction (the Y-axis direction) in the edges of the rotation protrusion 1026. In addition, a cross section of the seating grooves 1028 may have various shapes such as a round shape and a polygonal shape. All the components other than the seating grooves 1028 are the same as those of the camera module 1003 of FIGS. 17 and 18, and a detailed description thereof will thus be omitted.

In addition, since only positions in which the fourth ball bearings 1143 are provided are slightly different from the positions at which the fourth ball bearings 1143 are provided in the camera module 1003 of FIGS. 17 and 18 due to a structure in which the seating grooves 1028 are provided in the rotation holder 1120-3, and a mechanism in which the rotation holder 1120-3 is rotated around the first axis (the X axis) or the second axis (the Y axis) is the same as that of the camera module 1003 of FIGS. 17 and 18, such a mechanism is illustrated in FIGS. 19A through 19C and FIGS. 20A through 20C relating to the camera module 1003 of FIGS. 17 and 18.

Figure 25:
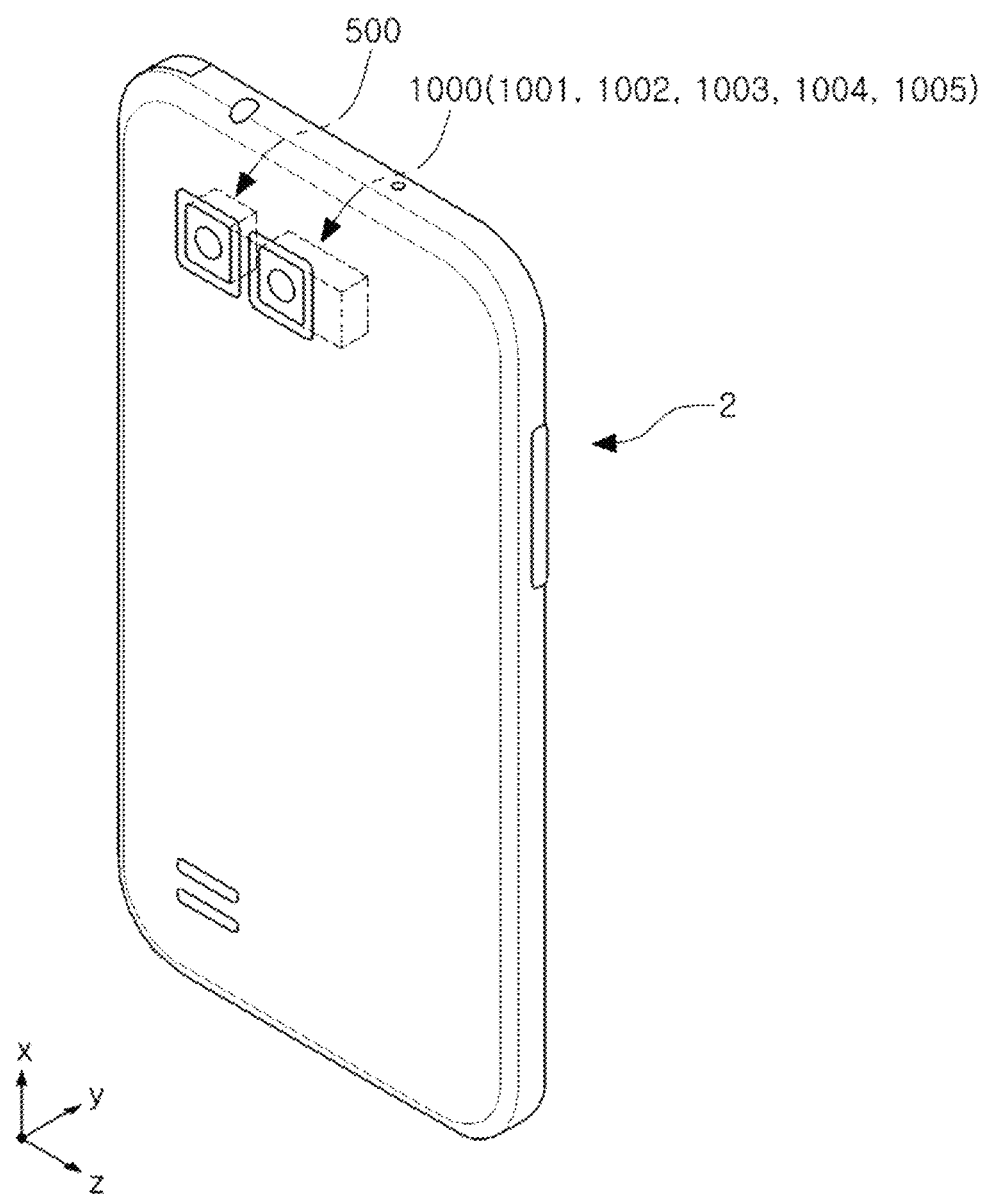
FIG. 25 is a perspective view illustrating another example of a portable electronic device.

FIG. 25 is a perspective view illustrating another example of a portable electronic device.

Referring to FIG. 25, a portable electronic device 2 is a portable electronic device such as a mobile communications terminal, a smartphone, or a tablet personal computer (PC) in which camera modules 500 and 1000 are mounted.

At least one of the camera modules 500 and 1000 may be the camera module 1001, 1002, 1003, 1004, or 1005 described with reference to FIGS. 2 through 24.

That is, a portable electronic device including a dual camera module may include the camera module 1001, 1002, 1003, 1004, or 1005 as at least one of two camera modules.

As set forth above, the reflecting module for OIS and the camera module including the same has a simple structure and a reduced size while implementing the autofocusing function, the zoom function, and the OIS function. In addition, power consumption is significantly reduced.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A camera module, comprising:
   a housing having an internal space;
   a reflecting module comprising a reflecting member and disposed in the internal space;
   a lens module comprising a plurality of lenses and disposed in the internal space movably in an optical axis direction;
   a first driving part comprising a first magnet and a first coil, and generating driving force in which the lens module moves in the optical axis direction; and
   a plurality of ball members disposed between the housing and the lens module, and guiding a movement of the lens module in the optical axis direction,
   wherein the first coil is disposed on the housing to oppose the lens module in a first axis direction perpendicular to an optical axis, and
   a yoke is disposed on the housing to oppose the lens module in a second axis direction perpendicular to both the optical axis and a first axis.

2. The camera module of claim 1, wherein the lens module is supported on the housing interposed the plurality of ball members therebetween by a magnetic attractive force acting in the second axis direction.

3. The camera module of claim 2, wherein the first magnet is disposed on the lens module, and
   the first magnet opposes to the first coil in the first axis direction and the first magnet opposes to the yoke in the second axis direction.

4. The camera module of claim 1, wherein the reflecting module is rotatable with respect to the first axis and a second axis, and wherein the camera module comprises a second driving part comprising a second magnet, a third magnet, a second coil and a third coil, and generating driving force in which the reflecting module rotates with respect to the first axis and the second axis.

5. The camera module of claim 4, wherein the second magnet and the third magnet are disposed on the reflecting module, and the second coil and the third coil are disposed on the housing.

6. The camera module of claim 5, wherein the second magnet and the second coil face in the second axis direction each other, and
the third magnet and the third coil face in the first axis direction each other.

7. The camera module of claim 5, wherein the housing comprises a plurality of through-holes exposing the first coil, the second coil and the third coil to the internal space, and
the first coil, the second coil and the third coil face the first magnet, the second magnet and the third magnet directly through the plurality of through-holes.

8. The camera module of claim 4, wherein the first coil, the second coil and the third coil are disposed on the housing in a state mounted on a main board.

9. The camera module of claim 8, wherein the first coil, the second coil and the third coil are mounted on the same main board.

10. The camera module of claim 8, wherein the first driving part further comprises a first position sensor detecting a position of the lens module, and
wherein the first position sensor is mounted on the main board disposed inside the first coil.

11. The camera module of claim 8, wherein the second driving part further comprises a second position sensor and a third position sensor detecting a position of the reflecting module, and
wherein the second position sensor and the third position sensor are mounted on the main board disposed inside the second coil and the third coil, respectively.

12. The camera module of claim 4, wherein the camera module further comprises ball bearings disposed between the housing and the reflecting module, and supporting a rotation of the reflecting module, and
wherein the reflecting module is supported on the housing interposed the ball bearings therebetween.

13. The camera module of claim 12, wherein the ball bearings comprise:
two first ball bearings arranged along the first axis and supporting the rotation of the reflecting module with respect to the first axis; and
two second ball bearings arranged along the second axis and supporting the rotation of the reflecting module with respect to the second axis.

14. The camera module of claim 13, wherein the reflecting module comprises:
a rotation holder in which the reflecting member is mounted, and rotating with respect to the first axis and the second axis; and
a rotation plate disposed between the housing and the rotation holder, and rotating with respect to the first axis together with the rotation holder.

15. The camera module of claim 14, wherein the first ball bearings are disposed between the housing and the rotation plate, and
the second ball bearings are disposed between the rotation plate and the rotation holder.

16. The camera module of claim 12, wherein the reflecting module is supported on the housing by a magnetic attractive force acting in the optical axis direction.

17. The camera module of claim 16, wherein a pulling magnet is disposed on the reflecting module, and a pulling yoke is disposed on the housing to face the pulling magnet in the optical axis.

18. The camera module of claim 1, wherein the camera module further comprises a stopper disposed in the housing disposed between the reflecting module and the lens module.

19. The camera module of claim 18, wherein at least a portion of the stopper is formed of an elastic material.

20. The camera module of claim 18, wherein the housing comprises a housing wall protruding from both side surfaces of the housing to a space between a space where the reflecting module is disposed and a space in where the lens module is disposed, and
the stopper is coupled to the housing wall.

21. A camera module, comprising:
a housing having an internal space;
a reflecting module comprising a reflecting member, and disposed rotatably in the internal space;
a lens module comprising a plurality of lenses, and disposed in the internal space movably in an optical axis direction;
a first driving part comprising a first magnet and a first coil, and generating driving force in which the lens module moves in the optical axis direction;
a plurality of ball members disposed between the housing and the lens module, and guiding a movement of the lens module in the optical axis direction; and
a yoke configured to pull the lens module toward the housing,
wherein the first coil and the yoke are disposed on different surfaces of the housing.

22. The camera module of claim 21, wherein the first magnet is disposed on the lens module, and
the first magnet faces the first coil in one direction and the first magnet faces the yoke in another direction different from the one direction.

23. The camera module of claim 22, wherein the first magnet and the first coil face each other in a first axis direction perpendicular to an optical axis direction, and
the first magnet and the yoke face each other in a second axis direction perpendicular to both the optical axis direction and the first axis.

24. The camera module of claim 21, wherein the camera module comprises a second driving part comprising a second magnet, a third magnet, a second coil and a third coil, and generating driving force in which the reflecting module rotates with respect to a first axis and a second axis.

25. The camera module of claim 24, wherein a direction in which the second magnet and the second coil oppose and a direction in which the third magnet and the third coil are perpendicular each other.

26. The camera module of claim 21, wherein the camera module comprises ball bearings disposed between the reflecting module and the housing, and supporting the reflecting module with respect to the housing rotatably, and
the reflecting module is supported on the housing interposed the ball bearings therebetween in the optical axis direction.

27. The camera module of claim 26, wherein a pulling magnet is disposed on the reflecting module, and a pulling yoke is disposed on the housing to face the pulling magnet in the optical axis direction.

* * * * *